US010480121B2

(12) United States Patent
Nakai et al.

(10) Patent No.: US 10,480,121 B2
(45) Date of Patent: Nov. 19, 2019

(54) SHEET-LIKE ARTICLE

(71) Applicant: Toray Industries, Inc., Tokyo (JP)

(72) Inventors: Shunichiro Nakai, Otsu (JP); Hisashi Murahara, Godo (JP); Yukihiro Matsuzaki, Godo (JP); Makoto Nishimura, Otsu (JP)

(73) Assignee: Toray Industries, Inc, Tokyo (JP)

( * ) Notice: Subject to any disclaimer, the term of this patent is extended or adjusted under 35 U.S.C. 154(b) by 0 days.

(21) Appl. No.: 15/519,965

(22) PCT Filed: Oct. 14, 2015

(86) PCT No.: PCT/JP2015/078986
§ 371 (c)(1),
(2) Date: Apr. 18, 2017

(87) PCT Pub. No.: WO2016/063761
PCT Pub. Date: Apr. 28, 2016

(65) Prior Publication Data
US 2017/0350069 A1    Dec. 7, 2017

(30) Foreign Application Priority Data

Oct. 24, 2014    (JP) ................................ 2014-216783

(51) Int. Cl.
| | | |
|---|---|---|
| *D06N 3/14* | (2006.01) | |
| *C08J 5/04* | (2006.01) | |
| *D06M 15/564* | (2006.01) | |
| *C08G 18/66* | (2006.01) | |
| *C08G 18/73* | (2006.01) | |
| *C08G 18/76* | (2006.01) | |
| *C08G 18/08* | (2006.01) | |
| *C08G 18/12* | (2006.01) | |
| *C08G 18/32* | (2006.01) | |
| *C08G 18/42* | (2006.01) | |
| *C08G 18/44* | (2006.01) | |

(52) U.S. Cl.
CPC ............ *D06N 3/14* (2013.01); *C08G 18/0823* (2013.01); *C08G 18/12* (2013.01); *C08G 18/3206* (2013.01); *C08G 18/4202* (2013.01); *C08G 18/4277* (2013.01); *C08G 18/44* (2013.01); *C08G 18/664* (2013.01); *C08G 18/73* (2013.01); *C08G 18/7621* (2013.01); *C08G 18/7671* (2013.01); *C08J 5/046* (2013.01); *D06M 15/564* (2013.01); *C08J 2375/04* (2013.01); *C08J 2467/02* (2013.01)

(58) Field of Classification Search
CPC ...... C08G 18/10; C08G 18/12; C08G 18/792; C08G 18/44; C08G 18/14; C08G 18/4202; C08G 18/4277; C08G 18/0823; C08G 18/3206; C08G 18/664; C08G 18/73; C08G 18/7621; C09D 175/06; C09D 175/04; C08L 75/04; C08J 2475/00; C08J 7/047; C08J 2375/04; C08J 2467/02; C08J 5/046; Y10T 428/31507; D06N 3/14; D06M 15/564
USPC ............. 428/844.8, 297.4; 430/286.1, 284.1; 525/80, 452; 524/591, 589, 590
See application file for complete search history.

(56) References Cited

U.S. PATENT DOCUMENTS

| | | | | |
|---|---|---|---|---|
| 3,102,835 | A * | 9/1963 | White ................. | D06M 15/564 |
| | | | | 118/56 |
| 2013/0005848 | A1 | 1/2013 | Kolde et al. | |
| 2013/0317171 | A1* | 11/2013 | Morikami .......... | C08G 18/6659 |
| | | | | 524/839 |

FOREIGN PATENT DOCUMENTS

| | | |
|---|---|---|
| CN | 102666626 A | 9/2012 |
| CN | 102803602 A | 11/2012 |
| EP | 2 514 779 A1 | 10/2012 |
| EP | 2 832 756 A1 | 2/2015 |
| JP | 59-192779 A | 11/1984 |
| JP | 3-244619 A | 10/1991 |
| JP | 11-81156 A | 3/1999 |
| JP | 2003-89985 A | 3/2003 |
| JP | 2004-346094 A | 12/2004 |
| JP | 2006-22221 A | 1/2006 |
| WO | 2013/146986 A1 | 10/2013 |

OTHER PUBLICATIONS

Ethylene Glycol, Center for Disease Control and Prevention, accessed online Apr. 24, 2018.*
Taiwanese Office Action dated Jun. 29, 2018, of counterpart Taiwan Application No. 10720588750, along with a brief English Summary.
Supplementary European Search Report dated May 23, 2018, of corresponding European Application No. 15853348.9.

(Continued)

*Primary Examiner* — Camie S Thompson
(74) *Attorney, Agent, or Firm* — DLA Piper LLP (US)

(57) ABSTRACT

A sheet like article produced from a polyurethane resin has a carbonate group and an oxycarbonyl group as ester groups and has uniform, elegant surface quality, a flexible, highly crease recoverable texture, and high resistance to light and hydrolysis, and also provided is a production method therefore. The sheet like article is produced by adding, as a binder, a polyurethane resin that meets requirements (I) and (II) to a fibrous base material formed mainly of ultrafine fibers: (I) a polyurethane resin such that the polyurethane resin contains, in its interior, an oxycarbonyl group and a carbonate group as ester groups; (II) a polyurethane resin such that the sum of the content of the urethane group and the content of the urea group in the polyurethane resin is 7.0 to 11.0 mass %.

12 Claims, No Drawings

(56) References Cited

OTHER PUBLICATIONS

The First Office Action dated Sep. 29, 2018, of counterpart Chinese Application No. 201580057586.8, along with an English translation.

The Second Office Action dated May 27, 2019, of counterpart Chinese Application No. 201580057586.8, along with an English translation.

* cited by examiner

SHEET-LIKE ARTICLE

TECHNICAL FIELD

This disclosure relates to a sheet like article obtained by adding a polyurethane resin to a fibrous base material and, more particularly, relates to a sheet-like material having excellent surface quality and texture and high durability and light resistance.

BACKGROUND

Suede- or nubuck-type leathery sheet like articles produced by raising, with sandpaper or the like, the surface of a sheet like article made of a fibrous base material made mainly of a fabric such as nonwoven fabric and polyurethane resin have appearance and surface characteristics resembling natural leather and also have excellent features such as uniformity, dyed color fastness, that are not found in natural leather, thus serving widely not only for clothing, but also for the coverings of furniture such as sofas, coverings of car interior materials, and other similar materials to be used for a long period of 5 to 10 years.

The properties of such a sheet like material can be designed widely by appropriately combining a fiber-made base material and a polyurethane resin.

For example, there is a proposal for using a polyurethane resin composed mainly of polytetramethylene glycol, an organic diisocyanate, and a glycol chain extender to produce a leather like sheet material having a very soft texture that is comparable to high grade wool fabrics used for business suits or the like (see Japanese Unexamined Patent Publication (Kokai) No. SHO 59-192779). However, polyether based polyurethane resins produced from polytetramethylene glycol tend to be easily degraded by ultraviolet rays and heat, and this may cause pilling on the surface during use or cause fibers to come off, resulting in the problem of the incapability of standing up to long term use. Polyester based polyurethane resin is also a polyurethane resin frequently used for production of leathery sheet like materials. It is highly light resistant against ultraviolet rays, for example, but suffers easily from degradation due to hydrolysis of ester bonds, leading to similar problems including generation of surface pilling and fibers coming-off during long term use.

To solve these problems, polycarbonate polyol based polyurethane resins have been used as resin components to impregnate fibrous base materials for use in leathery sheet like articles to serve for applications for automobile interior finishing, particularly those requiring durability.

For example, there is a proposal for using polycarbonate based polyurethane resin produced by reaction of a polycarbonate polyol, an alicyclic polyisocyanate, and an aromatic polyisocyanate (see Japanese Unexamined Patent Publication (Kokai) No. HEI 3-244619). When adopted as a resin component to impregnate a nonwoven fabric of ultrafine fibers, however, the use of a polycarbonate based polyurethane resin based on a polyhexamethylene carbonate results in a sheet like article with a plastic like texture and coarse touch. When surface fibers are raised with sand paper, in particular, the polyurethane resin can become too stiff and form a coarse surface with short raised fibers, possibly leading to a great difficulty in realizing a high quality product with elegant raised fibers.

In addition, it has been reported that a specific type of aqueous polyurethane resins serve to produce an artificial leather that has an improved processing yield and heat resistance that enables long term continuous operation of the dyeing machine, and a polycarbonate based polyurethane has been proposed as such a specific aqueous polyurethane (Japanese Unexamined Patent Publication (Kokai) No. HEI 11-81156). However, the leathery sheet like article disclosed in that proposal is extremely low in polyurethane content and raised surface fibers can come off to cause a large change in appearance when used for a long term, possibly leading to an extreme case where the woven fabric reinforcing material is exposed from the surface. When a raised fiber type leathery sheet like article is produced by using such an aqueous polyurethane resin, an increased addition of polyurethane resin aiming to improve durability can cause extreme shortening of raised fibers or stiffening of the texture even when it is a slight increase. Thus, it is difficult to produce a leathery sheet like article that is high in both flexibility and durability.

Thus, it could be helpful to provide a sheet like article having elegant surface quality with uniform appearance, flexible and highly crease recoverable texture, and high resistance to light and hydrolysis.

SUMMARY

Our sheet like articles are produced by adding, as a binder, a polyurethane resin that meets the requirements (I) and (II) to a fibrous base material that contains ultrafine fibers. (I) The polyurethane resin contains, in its interior, an oxycarbonyl group and a carbonate group as ester groups. (II) The polyurethane resin contains a urethane group and/or a urea group with a total content of 7.0 to 11.0 mass %.

The compressibility of the sheet like article may be 13% or more and 20% or less and its compression modulus may be 55% or more and 75% or less.

The ratio by number between the oxycarbonyl group and the carbonate group in the polymeric polyol present in the polyurethane resin may be 5:95 to 95:5.

10 mass % to 100 mass % of the polymeric polyol molecules present in the polyurethane resin may be accounted for by polyol molecules having an oxycarbonyl group and a carbonate group.

The polyurethane resin may have a hydrophilic group.

1.0 to 4.0 mass % of the polyurethane resin may be accounted for by the urea group.

The organic polyisocyanate component of the polyurethane resin may be at least one type of polyisocyanate selected from the group consisting of an aromatic polyisocyanate containing 8 to 26 carbon atoms, an aliphatic polyisocyanate containing 4 to 22 carbon atoms, and an alicyclic polyisocyanate containing 8 to 18 carbon atoms.

The organic polyisocyanate component of the polyurethane resin may be an aromatic polyisocyanate.

The polymeric polyol present in the polyurethane resin may contain an amorphous polycarbonate polyol having a melting point of 20° C. or less.

The polymeric polyol present in the polyurethane resin may contain a polycarbonate polyol produced by copolymerizing two or more polyhydric alcohols having different carbon backbones.

The polyurethane resin may have at least one reactive group selected from the group consisting of a carboxyl group, hydroxyl group, primary amino group, and secondary amino group and may further contain a crosslinking agent that is at least one crosslinking agent selected from the group consisting of an isocyanate compound, block isocyanate compound, melamine compound, oxazoline compound, carbodiimide compound, aziridine compound, epoxy compound, and hydrazine compound and that is reactive to the reactive group contained in the polyurethane resin.

The polyurethane resin may be produced by coagulating an aqueous dispersion of polyurethane.

We thus apply a polyurethane resin to the production of a sheet like article having elegant surface quality with uniform appearance, densely raised soft touch, flexible and highly crease recoverable texture, and high resistance to light and hydrolysis.

DETAILED DESCRIPTION

Regarding the Sheet Like Article

Our sheet like articles are described in detail first.

The sheet like article is produced by adding, as a binder, a polyurethane resin that meets the requirements (I) and (II) given below to a fibrous base material that contains ultrafine fibers.

(I) A polyurethane resin such that the polyurethane resin contains, in its interior, an oxycarbonyl group and a carbonate group as ester groups.

(II) A polyurethane resin such that the sum of the content of the urethane group and the content of the urea group in the polyurethane resin is 7.0 to 11.0 mass %.

The sheet like article is produced by adding, as a binder, a polyurethane resin with a specific component to a fibrous base material such as nonwoven fabrics formed of ultrafine fibers, as described above.

The sheet like article is produced by adding, as a binder, a polyurethane resin to a fibrous base material such as nonwoven fabrics formed of ultrafine fibers, the fibers that can constitute such a fibrous base material include polyesters such as polyethylene terephthalate, polybutylene terephthalate, polytrimethylene terephthalate, and polylactic acid; polyamides such as 6-nylon and 66-nylon; and melt-spinnable thermoplastic resins such as acrylic, polyethylene, polypropylene, and thermoplasticity cellulose. Particularly, it is preferable to use polyester fibers from the viewpoint of strength, dimensional stability, and light resistance. Furthermore, the fibrous base material may be produced by mixing fibers of difference materials.

As for the cross-sectional shape of the ultrafine fibers, a circular cross section is suitable though fibers having cross sections of non-circular shapes such as an ellipse, flat shape, polygon such as triangle, fan, and cross may also be adopted.

The average single fiber diameter of the ultrafine fibers constituting a fibrous base material is preferably 0.3 to 7 Controlling the average monofilament diameter at preferably 7 or less, more preferably 6 µm or less, and still more preferably 5 µm or less, makes it possible to obtain a sheet like article having high softness and good raised fiber quality. On the other hand, if the average monofilament diameter is controlled at preferably 0.3 µm or more, more preferably 0.7 µm or more, and still more preferably 1 µm or more, the resulting sheet like article will be excellent in the post-dyeing color development property, the dispersibility of bundled fibers at the time of the napping process such as grinding with sandpaper or the like, and the ease of separation.

As for the configuration of a fibrous base formed of ultrafine fibers, it is possible to adopt a fibrous base material in the form of woven, knitted, or nonwoven fabrics, or the like. Among others, the use of a nonwoven fabric is preferable because the sheet like article will have good surface quality after being subjected to surface fiber raising treatment.

As the nonwoven fabric, either short fiber nonwoven fabrics or long fiber nonwoven fabrics may be used, but from the viewpoint of texture and quality, the use of short fiber nonwoven fabrics is preferable.

The short fibers in the short fiber nonwoven fabrics preferably have a fiber length of 25 mm or more and 90 mm or less, more preferably 35 mm or more and 75 mm or less. Controlling the fiber length at 25 mm or more makes it possible to obtain a sheet like article having high abrasion resistance attributed to entanglement. Furthermore, controlling the fiber length at 90 mm or less makes it possible to obtain a sheet like material with improved texture and quality.

In a nonwoven fabric formed of a fibrous base material of ultrafine fibers, the nonwoven fabrics preferably have a structure formed of bundles of ultrafine fibers (fiber bundles) entangled together. The entanglement of bundles of ultrafine fibers allows the sheet like article to have improved strength. Such a nonwoven fabric can be produced by entangling ultrafine fiber-developing type fibers first and then converting them into ultrafine fibers.

If ultrafine fibers or bundles thereof constitute the nonwoven fabrics, it may be effective to add woven or knitted fabrics into the ultrafine fibers or bundles thereof with the aim of, for example, increasing the strength. Fibers constituting such woven or knitted fabrics preferably have an average monofilament diameter of about 0.3 to 10 µm.

The polyurethane resins that can be used as the binder include polymeric polyol having a number average molecular weight (hereinafter, occasionally abbreviated as Mn) of preferably 500 or more and polyurethane resin formed through a reaction of an organic polyisocyanate with a chain extender.

Examples of the polymeric polyol with a Mn of 500 or more include polyester polyol and polyether polyol. These polymeric polyols may be used either singly or as a combination of two or more thereof.

Examples of the polyester polyol include those polyester polyols having only a carbonate group as ester group, those polyester polyols having only an oxycarbonyl group as ester group, and those polyester polyols having a carbonate group and an oxycarbonyl group as ester groups.

Those polyester polyols having only a carbonate group as ester group include polycarbonate polyol produced through simultaneous dealcoholization and condensation reactions between one or two or more types of (preferably 2 to 4 types of) polyhydric alcohols containing 2 to 20 carbon atoms (preferably aliphatic divalent alcohols containing 3 to 9 carbon atoms, more preferably containing 4 to 6 carbon atoms) and a low molecular weight carbonate compound (for example, dialkyl carbonate with an alkyl group containing 1 to 6 carbon atoms, alkylene carbonate with an alkylene group containing 2 to 6 carbon atoms, and diaryl carbonate with an aryl group containing 6 to 9 carbon atoms).

Those polyhydric alcohols containing 2 to 20 carbon atoms include linear or branched aliphatic divalent alcohols containing 2 to 12 carbon atoms (for example, linear alcohols such as ethylene glycol, 1,3-propylene glycol, 1,4-butanediol, 1,5-pentanediol, 1,6-hexanediol, 1,7-heptanediol, 1,8-octanediol, 1,9-nonanediol, 1,10-dodecanediol, diethylene glycol, triethylene glycol, and tetraethylene glycol; and branching alcohols such as 1,2-, 1,3- or 2,3-butanediol, 2-methyl-1,4-butanediol, neopentyl glycol, 2,2-diethyl-1,3-propanediol, 2-methyl-1,5-pentanediol, 3-methyl-1,5-pentanediol, 2-methyl-1,6-hexanediol, 3-methyl-1,6-hexanediol, 2-methyl-1,7-heptanediol, 3-methyl-1,7-heptanediol, 4-methyl-1,7-heptanediol, 2-methyl-1,8-octanediol, 3-methyl-1,8-octanediol, and 4-methyl octanediol); alicyclic divalent alcohols containing 6 to 20 carbon atoms (such as 1,4-cyclohexanediol, 1,3-cyclohexanedimethanol, 1,4-cyclohexanediol, 1,3-cyclopentanediol, 1,4-cycloheptanediol, 2,5-bis(hydroxymethyl)-1,4-dioxane, 2,7-norbornane diol s, tetrahydrofuran dimethanol, 1,4-bis(hydroxyethoxy) cyclohexane, 1,4-bis (hydroxymethyl) cyclohexane, and 2,2-bis(4-hydroxycyclohexyl) propane); aromatic ring-containing divalent alcohol with 8 to 20 carbon atoms (m- or p-xylylene glycol, bis (hydroxyethyl) benzene, and bis(hydroxyethoxy) benzene); trivalent alcohols containing 3 to 20 carbon atoms (such as aliphatic triols (including glycerin and trimethylolpropane)); tetrahydric to octahydric alcohols containing 5 to 20 carbon atoms (aliphatic polyols (such as pentaerythritol, sorbitol, mannitol, sorbitan, diglycerin, and dipentaerythritol); saccharides (sucrose, glucose, mannose, fructose, methylglucoside, and derivatives thereof)) and the like.

The polyester polyols having only a carbonate group as ester group may contain an amorphous polycarbonate polyol with a melting point of 20° C. or less. The polyester polyols having only a carbonate group as ester group tend to be inferior in flexibility, although high in water resistance, heat resistance, and weather resistance due to the strong cohesive power possessed by the polycarbonate group, but the existence of an amorphous polycarbonate polyol with a melting point of 20° C. or less acts to prevent the resulting sheet like articles from having a stiff texture.

It is preferable that for the aforementioned amorphous polycarbonate polyol, the aforementioned polyhydric alcohol containing 2 to 20 carbon atoms be a combination of two or more linear or branched aliphatic divalent alcohols containing 2 to 12 carbon atoms, and it is more preferable that the amorphous polycarbonate polyol to be used be a combination of two or more divalent alcohols selected from the group consisting of 1,4-butanediol, 1,5-pentanediol, 1,6-hexanediol, 3-methyl-1,5-pentanediol, 1,9-nonanediol, and 2-methyl-1,8-octanediol. It is particularly preferable that the amorphous polycarbonate polyol be a combination of 1,5-pentanediol and 1,6-hexanediol. The polycarbonate polyol produced by copolymerizing polyhydric alcohols having different carbon backbones tends to have a structure having an irregular molecular arrangement, in which soft segments composed mainly of polyols are formed to give a flexible polyurethane resin.

The amorphous polycarbonate polyol preferably has a melting point of −80 to 15° C. from the viewpoint of flexibility and impact resilience of the polyurethane resin.

Commercial products of amorphous polycarbonate polyols include (DURANOL (registered trademark) G4672 (copolymer of a unit in which the carbon backbone has a C4 linear structure and a unit in which the carbon backbone has a C5 linear carbon structure)) (manufactured by Asahi Kasei Chemicals Corporation), (DURANOL (registered trademark) T5652 (copolymer of a unit in which carbon backbone has a C5 linear structure and unit in which the carbon backbone has a C6 linear structure)) (manufactured by Asahi Kasei Chemicals Corporation), (KURARAY POLYOL (registered trademark) C-2090 (copolymer of a unit in which the carbon backbone contains a C5 linear, methyl-containing branched structure and a unit in which the carbon backbone has a C6 linear structure)) (manufactured by Kuraray Co., Ltd.), (KURARAY POLYOL (registered trademark) C-3090 (copolymer of a unit in which the carbon backbone contains a C5 linear, methyl-containing branched structure and a unit in which the carbon backbone has a C6 linear structure)) (manufactured by Kuraray Co., Ltd.), (KURARAY POLYOL (registered trademark) C-2050 (copolymer of a unit in which the carbon backbone contains a C8 linear, methyl-containing branched structure and a unit in which the carbon backbone has a C9 linear structure)) (manufactured by Kuraray Co., Ltd.), and (KURARAY POLYOL (registered trademark) C-2015N) (manufactured by Kuraray Co., Ltd.). In the aforementioned crystal polyols, the carbon backbone is formed only of a C6 linear structure.

In addition, commercial products of crystalline polycarbonate polyols include (DURANOL (registered trademark) T6002) (manufactured by Asahi Kasei Chemicals Corporation), (ETERNACOLL (registered trademark) UH-200) (manufactured by Ube Industries, Ltd.), (NIPPOLAN (registered trademark)-980R) (manufactured by Nippon Polyurethane Industry Co., Ltd.), (PLACCEL (registered trademark) CD220) (manufactured by Daicel Chemical Industries, Ltd.), and (KURARAY POLYOL (registered trademark) C-2065N) (manufactured by Kuraray Co., Ltd.).

The polyester polyols having only an oxycarbonyl group as ester group include dehydration-condensation type polyester polyol and polylactone polyol. Examples of the dehydration-condensation type polyester polyol include those produced by condensation between a polyhydric alcohol containing 2 to 20 carbon atoms and a polycarboxylic acid containing 2 to 10 carbon atoms or an ester-forming derivative thereof (such as acid anhydride, lower (containing 1 to 4 carbon atoms) alkyl ester, and acid halide).

The polycarboxylic acids containing 2 to 10 carbon atoms and ester-forming derivatives thereof include aliphatic dicarboxylic acids (such as succinic acid, adipic acid, azelaic acid, sebacic acid, fumaric acid, and maleic acid), alicyclic dicarboxylic acids (such as dimer acid), aromatic dicarboxylic acids (such as terephthalic acid, isophthalic acid, and phthalic acid), trivalent or higher polycarboxylic acids (such as trimellitic acid and pyromellitic acid), anhydrides thereof (such as succinic anhydride, maleic anhydride, phthalic anhydride, and trimellitic anhydride), acid halides thereof (such as adipic acid dichloride), low molecular weight alkyl esters (such as dimethyl succinate and dimethyl phthalate), and combinations thereof. Of these, preferred ones include aliphatic dicarboxylic acids and ester-forming derivatives thereof.

The polyhydric alcohols containing 2 to 20 carbon atoms and the polycarboxylic acids containing 2 to 10 carbon atoms or ester-forming derivatives thereof that can be used for the polyester polyols having only an oxycarbonyl group as ester group may be used either singly or as a combination of two or more thereof.

The polylactone polyols include those produced by ring opening polymerization of a lactone monomer (such as γ-butyrolactone, γ-valerolactone, ε-caprolactone, and a mixture of two or more thereof) using the aforementioned polyhydric alcohol containing 2 to 20 carbon atoms as initiator.

Of the polyester polyols having only an oxycarbonyl group as ester group, polycaprolactone polyol is preferred from the viewpoint of the flexibility, impact resilience, and hydrolysis resistance of the polyurethane resin.

The polyether polyols include alkylene oxide (hereinafter, occasionally abbreviated as AO) adducts of the polyhydric alcohols containing 2 to 20 carbon atoms.

The AOs that can be added to a polyhydric alcohol containing 2 to 20 carbon atoms include those containing 2 to 12 carbon atoms (such as ethylene oxide (hereinafter, occasionally abbreviated as EO), 1,2- or 1,3-propylene oxide, 1,2-, 1,3- or 2,3-butylene oxide, tetrahydrofuran (hereinafter, occasionally abbreviated as THF), 3-methyltetrahydrofuran, styrene oxide, α-olefin oxide, and epichlorohydrin).

These AOs may be used singly or as a combination of two or more thereof. When two or more AOs are used in combination, there is no restriction on the order of their bonding to, for example, a divalent alcohol containing 2 to 20 carbon atoms, and the bonding may be of a random type, block type, or a combination thereof.

The polyester polyols having a carbonate group and an oxycarbonyl group as ester groups include those produced by a method in which an aforementioned polyhydric alcohol containing 2 to 20 carbon atoms, an aforementioned low molecular weight carbonate compound, and an aforementioned polycarboxylic acid containing 2 to 10 carbon atoms or an ester-forming derivative thereof are condensed, a method in which an aforementioned polyester polyol having only a carbonate group as ester group, an aforementioned polyhydric alcohol containing 2 to 20 carbon atoms, and an aforementioned polycarboxylic acid containing 2 to 10 carbon atoms or an ester-forming derivative thereof are condensed, a method in which an aforementioned polyester polyol having only an oxycarbonyl group as ester group, an aforementioned polyhydric alcohol containing 2 to 20 carbon atoms, and a low molecular weight carbonate compound are condensed, a method in which an aforementioned lactone monomer is subjected to ring opening polymerization using an aforementioned polycarbonate polyol as initiator, or a method in which an aforementioned polyester polyol having only a carbonate group as ester group, an aforementioned polyester polyol having only an oxycarbonyl group as ester group are subjected to ester interchange.

From the viewpoint of the hydrolysis resistance, flexibility, and impact resilience of the polyurethane resin, the ratio by number between the oxycarbonyl group and the carbonate group in a polyester polyol having a carbonate group and an oxycarbonyl group as ester groups is preferably 5:95 to 95:5, more preferably 10:90 to 90:10, particularly preferably 20:80 to 80:20, and most preferably 30:70 to 70:30. If the proportion of the oxycarbonyl group is too small, the sheet like article will decrease in flexibility and, when surface fibers are raised with sand paper, the polyurethane resin may become too stiff, possibly leading to an inferior surface with poor raised fibers. If the proportion of the oxycarbonyl group is too large, on the other hand, the polyurethane resin will deteriorate in hydrolysis resistance, leading to the failure to obtain a sheet like article that can withstand long term use.

In a polyester polyol having a carbonate group and an oxycarbonyl group as ester groups, it is preferable for the constituent unit that contains the oxycarbonyl group to be formed of polycaprolactone, from the viewpoint of the hydrolysis resistance of the polyurethane resin.

The polyester polyols having only a carbonate group as ester group, polyester polyols having only an oxycarbonyl group as ester group, and polyester polyols having a carbonate group and an oxycarbonyl group as ester groups are preferably diols from the viewpoint of the flexibility of the polyurethane resin.

A polymeric polyol contains, as an essential component, a polyester polyol having a carbonate group and an oxycarbonyl group as ester groups. The existence of a polyester polyol having a carbonate group and an oxycarbonyl group as ester groups in the polymeric polyol serves to produce a polyurethane resin that is high in weather resistance, heat resistance, hydrolysis resistance, flexibility, and impact resilience.

From the viewpoint of weather resistance, heat resistance, hydrolysis resistance, flexibility, and impact resilience, the polyester polyol having a carbonate group and an oxycarbonyl group as ester groups contained in the polymeric polyol preferably accounts for 10 to 100 mass %, more preferably 20 to 100 mass %, relative to the mass of the polymeric polyol. If the content of the polyester polyol having a carbonate group and an oxycarbonyl group is less than 10 mass % of the mass of the polymeric polyol, the polyurethane will be low in durability and the sheet like article will fail not only to be durable against long term use, but also to achieve a texture high in both flexibility and impact resilience.

In addition to the polyester polyol having a carbonate group and an oxycarbonyl group as ester groups, which is an essential component, a polyester polyol having only a carbonate group as ester group, a polyester polyol having only an oxycarbonyl group as ester group, and a polyether polyol may also be used as polymeric polyol components. Of these polymeric polyols to be used in combination, the use of a polyester polyol having only a carbonate group as ester group is preferred from the viewpoint of the weather resistance, hydrolysis resistance, and heat resistance of the polyurethane resin. Of such polymeric polyols, the use of an amorphous polycarbonate polyol with a melting point of 20° C. or less is particularly preferred from the viewpoint of the flexibility and impact resilience of the polyurethane resin.

From the viewpoint of weather resistance, hydrolysis resistance, and heat resistance of the polyurethane resin, the polymeric polyol to be used is preferably a singly used polyester polyol having a carbonate group and an oxycarbonyl group or a combination of a polyester polyol having a carbonate group and an oxycarbonyl group and a polyester polyol having only a carbonate group as ester group. From the viewpoint of flexibility and impact resilience, still more preferable polymeric polyols include a singly used polyester polyol having a carbonate group and an oxycarbonyl group and a combination of a polyester polyol having a carbonate group and an oxycarbonyl group and an amorphous polycarbonate polyol with a melting point of 20° C. or less, of which the singular use of a polyester polyol having a carbonate group and an oxycarbonyl group is particularly preferable.

From the viewpoint of flexibility and impact resilience, the polymeric polyol preferably has a Mn of 500 to 6,000, more preferably 600 to 5,000, and particularly preferably 700 to 4,000.

The compound having a hydrophilic group and active hydrogen contained as an essential component in the active hydrogen component may be a compound containing an anionic group and active hydrogen or a compound containing a cationic group and active hydrogen. Such compounds containing a hydrophilic group and active hydrogen may be used singly or used as a combination of two or more thereof.

Examples of the compound containing an anionic group and active hydrogen include, for example, compounds containing 2 to 10 carbon atoms and a carboxyl group as the anionic group (dialkylolal alkanoic acid (for example, 2,2-dimethylol propionic acid, 2,2-dimethylol butane acid, 2,2-dimethylol heptane acid, and 2,2-dimethylol octanoic acid), tartaric acid, amino acid (such as glycine, alanine, and valine), and the like), compounds containing 2 to 16 carbon atoms and a sulfo group as the anionic group (3-(2,3-dihydroxy propoxy)-1-propane sulfonic acid, sulfoisophthalic acid di(ethylene glycol) ester, and the like), compounds containing 2 to 10 carbon atoms and a sulfamic acid group as the anionic group (N,N-bis(2-hydroxyl ethyl)

sulfamic acid, and the like), and salts formed through neutralization thereof with neutralization agents.

Examples of the compound containing a cationic group and active hydrogen include, for example, salts formed through neutralization, with an undermentioned neutralization agent, of such compounds as diols containing 1 to 20 carbon atoms and a tertiary amino group (N-alkyl dialkanol amine (for example, N-methyl diethanol amine, N-propyl diethanol amine, N-butyl diethanol amine, and N-methyl dipropanol amine), N,N-dialkyl monoalkanol amine (for example, N,N-dimethyl ethanol amine) and the like).

It is preferable from the viewpoint of the weather resistance of the polyurethane resin that the compound containing a hydrophilic group and active hydrogen be a compound containing an anionic group and active hydrogen, and examples thereof that are more preferable from the viewpoint of mechanical strength and dispersion stability of the polyurethane resin include 2,2-dimethylol propionic acid, 2,2-dimethylol butane acid, and neutralized salts thereof, of which particularly preferable are salts formed through neutralization of 2,2-dimethylol propionic acid or 2,2-dimethylol butane acid with amine compounds.

The active hydrogen component may further contain a chain extender and a reaction terminator. Chain extenders and reaction terminators may be used singly or as a combination of two or more thereof.

Useful chain extenders include water, polyhydric alcohols containing 2 to 20 carbon atoms, aliphatic polyamines containing 2 to 36 carbon atoms (alkylene diamines such as ethylene diamine and hexamethylene diamine; poly- (n=2 to 6) alkylene (containing 2 to 6 carbon atoms) poly-(n=3 to 7) amines such as diethylene triamine, dipropylene triamine, dihexylene triamine, triethylene tetramine, tetraethylene pentamine, pentaethylene hexamine and hexaethylene heptamine and the like), alicyclic polyamines containing 6 to 20 carbon atoms (1,3- or 1,4-diaminocyclohexane, 4,4'- or 2,4'-dicyclohexyl methane diamine, and isophorone diamine, and the like), aromatic polyamines containing 6 to 20 carbon atoms (1,3- or 1,4-phenylene diamine, 2,4- or 2,6-tolylene diamine, 4,4'- or 2,4'-methylene bisaniline, and the like), heterocyclic polyamines containing 3 to 20 carbon atoms (2,4-diamino-1,3,5-triazine, piperazine, and N-aminoethyl piperazine, and the like), hydrazine and derivatives thereof (dibasic acid dihydrazide such as adipic acid dihydrazide), and aminoalcohols containing 2 to 20 carbon atoms (for example, ethanol amine, diethanol amine, 2-amino-2-methyl propanol, and triethanol amine) and the like.

From the viewpoint of the mechanical strength of the polyurethane resin, preferable chain extenders include water, polyhydric alcohols containing 2 to 20 carbon atoms, aliphatic polyamines containing 2 to 36 carbon atoms, alicyclic polyamine containing 6 to 20 carbon atoms, and aromatic polyamines containing 6 to 20 carbon atoms.

Useful reaction terminators include monoalcohols containing 1 to 20 carbon atoms (such as methanol, ethanol, butanol, octanol, decanol, dodecyl alcohol, myristyl alcohol, cetyl alcohol, and stearyl alcohol); and monoamines containing 1 to 20 carbon atoms (mono- or di-alkyl amines such as monomethyl amine, monoethyl amine, monobutyl amine, dibutyl amine, and monooctyl amine; mono- or di-alkanol amines such as monoethanol amine, diethanol amine, and diisopropanol amine and the like).

Those organic polyisocyanate components that have been used in conventional polyurethane production processes can be applied, and they include aromatic polyisocyanates containing 8 to 26 carbon atoms and 2 or 3 or more isocyanate groups, aliphatic polyisocyanates containing 4 to 22 carbon atoms, alicyclic polyisocyanates containing 8 to 18 carbon atoms, araliphatic polyisocyanates containing 10 to 18 carbon atoms, and modifications of these polyisocyanates. These organic isocyanate components may be used singly or as a combination of two or more thereof.

Any polyisocyanate selected from the above group is used favorably because of having a sufficient reactivity to compounds with active hydrogen and being easy to control in performing molecular design and synthesis of polyurethane. Furthermore, it can be coagulated easily within the resulting polyurethane molecule to promote the coagulation of hard segments or formation of hard domains, thus serving to obtain polyurethane suitable for a sheet like article with impact resilience.

Useful aromatic polyisocyanates containing 8 to 26 carbon atoms include, for example, 1,3- or 1,4-phenylene diisocyanate, 2,4- or 2,6-tolylene diisocyanate (hereinafter, tolylene diisocyanate will be occasionally abbreviated as TDI), crude TDI, 4,4'- or 2,4'-diphenyl methane diisocyanate (hereinafter, diphenyl methane diisocyanate will be occasionally abbreviated as MDI), crude MDI, polyaryl polyisocyanate, 4,4'-diisocyanatobiphenyl, 3,3'-dimethyl-4,4'-diisocyanatobiphenyl, 3,3'-dimethyl-4,4'-diisocyanatodiphenyl methane, 1,5-naphthylene diisocyanate, 4,4',4"-triphenyl methane triisocyanate, and m- or p-isocyanatophenylsulfonyl isocyanate.

Useful aliphatic polyisocyanates containing 4 to 22 carbon atoms include, for example, ethylene diisocyanate, tetramethylene diisocyanate, hexamethylene diisocyanate (hereinafter, occasionally abbreviated as HDI), dodecamethylene diisocyanate, 1,6,11-undecane triisocyanate, 2,2,4-trimethyl hexamethylene diisocyanate, lysine diisocyanate, 2,6-diisocyanatomethyl caproate, bis(2-isocyanatoethyl) fumarate, bis(2-isocyanatoethyl) carbonate, and 2-isocyanatoethyl-2,6-diisocyanatohexanoate.

Useful alicyclic polyisocyanates containing 8 to 18 carbon atoms include, for example, isophorone diisocyanate (hereinafter, occasionally abbreviated as IPDI), 4,4-dicyclohexylmethane diisocyanate (hereinafter, occasionally abbreviated as hydrogenated MDI), cyclohexylene diisocyanate, methylcyclohexylene diisocyanate, bis(2-isocyanatoethyl)-4-cyclohexene-1,2-dicarboxylate, and 2,5- or 2,6-norbornane diisocyanate.

Examples of the aralipathic polyisocyanate containing 10 to 18 carbon atoms include, for example, m- or p-xylylene diisocyanate and α,α,α',α'-tetramethyl xylylene diisocyanate.

Examples of polyisocyanate modifications include modifications of the above-mentioned polyisocyanates (such as modifications containing a urethane group, carbodiimide group, allophanate group, urea group, biuret group, urethodione group, urethoimine group, isocyanurate group, or oxazolidone group; those having a free isocyanate group content of normally 8 to 33 mass %, preferably 10 to 30 mass %, and particular 12 to 29 mass %), which include modified MDI (urethane modified MDI, carbodiimide modified MDI, trihydrocarbyl phosphate modified MDI, and the like), urethane modified TDI, biuret modified HDI, isocyanurate modified HDI, isocyanurate modified IPDI and the like.

Aqueous media include water and mixtures of water and organic solvents. Examples of organic solvents include ketone based solvents (such as acetone, methyl ethyl ketone, and methyl isobutyl ketone), ester based solvents (such as ethyl acetate, butyl acetate, and γ-butyrolactone), ether based solvents (such as THF), amide based solvents (such as N,N-dimethyl formamide (hereinafter, occasionally abbreviated as DMF), N,N-dimethyl acetamide, N-methyl-2-pyrolidone, and N-methyl caprolactam), alcohol based solvents (such as methanol, ethanol, and isopropyl alcohol), and aromatic hydrocarbon based solvents (such as toluene and xylene). These organic solvents may be used either singly or as a combination of two or more thereof. Of these, water-soluble organic solvents are preferable from the viewpoint of dispersibility.

Of the organic polyisocyanate components, the organic polyisocyanates that are preferred from the viewpoint of the mechanical physical properties of the polyurethane resin include aromatic polyisocyanates, aliphatic polyisocyanates, and alicyclic polyisocyanates, of which aromatic polyisocyanates and alicyclic polyisocyanates are more preferable. Particularly preferable are MDI, TDI, and HDI, and the most preferable is 4,4'-MDI.

Introducing a sulfo group, a carboxyl group, a hydroxyl group, or a primary or secondary amino group into the polyurethane resin and adding a crosslinking agent reactive to these functional groups into the polyurethane resin composition serve to produce a resin that has an increased molecular weight or an increased crosslink density after reaction, thereby enabling further improvement in durability, weather resistance, heat resistance, and wet strength retention.

A method to introduce a hydroxyl group into polyurethane resin is to use, as an active hydrogen component, a polymeric polyol, a compound containing a hydrophilic group and active hydrogen, and/or a chain extender in which only a hydroxyl group is contained as the active hydrogen-containing group and perform a reaction under conditions where the quantity of the hydroxyl group in the active hydrogen component is in excess of the equivalent quantity of the isocyanate in the organic polyisocyanate component.

A method to introduce a carboxyl group and/or a sulfo group into polyurethane resin is to use, as part of the active hydrogen component, a compound containing 2 to 10 carbon atoms and a carboxyl group and/or a sulfo group as the anionic group.

A method to introduce a primary or secondary amino group into polyurethane resin is to first form a urethane prepolymer having an isocyanate group by reacting a polymeric polyol, and if necessary, a compound containing a hydrophilic group and active hydrogen, with an organic polyisocyanate component and subsequently react the urethane prepolymer with the aforementioned chain extender, which is water, an aliphatic polyamine containing 2 to 36 carbon atoms, an alicyclic polyamine containing 6 to 20 carbon atoms, an aromatic polyamine containing 6 to 20 carbon atoms, and/or a heterocyclic polyamine containing 3 to 20 carbon atoms, under conditions where the quantity of the latter is in excess of the equivalent quantity of the isocyanate in the former.

Useful crosslinking agents include those having, in one molecule, two or more reactive groups that can react with the reactive groups contained in the polyurethane resin, and specific examples include water-soluble isocyanate compounds, blocked isocyanate compounds, melamine based compounds, oxazoline based compounds, carbodiimide based compounds, aziridine based compounds, epoxy based compounds, and hydrazine based compounds. These crosslinking agents may be used either singly or as a combination of two or more thereof.

The isocyanate compound has two or more isocyanate groups in one molecule and, for example, the same isocyanate compounds as listed previously for the organic polyisocyanate component can be used.

The blocked isocyanate compound has two or more blocked isocyanate groups in one molecule and examples of this blocked isocyanate compound include, for example, compounds formed by blocking those aforementioned isocyanate compounds with blocking agents (such as phenols, secondary or tertiary alcohols, oximes, aliphatic or aromatic secondary amines, phthalic imides, lactams, active methylene compounds (such as dialkyl malonate), pyrazole based compound (such as pyrazole and 3,5-dimethyl pyrazole), and sodium bisulfite).

Commercial products of blocked isocyanate include DURANATE (registered trademark) series (DURANATE (registered trademark) 22A-75P, 24A-100, 21S-75E, TPA-100, TKA-100, MFA-75B, MHG-80B, TLA-100, TSA-100, TSS-100, TSE-100, P301-75E, E402-80B, E405-70B, AE700-100, D101, D201, MF-K60X, A201H or the like) manufactured by Asahi Kasei Chemicals Corporation, and TAKENATE (registered trademark) series (TAKENATE (registered trademark) D-103N, D-160N, D-140N, D-110N, D-181N, D-120N, D-165N90CX, D-204, D-170N, PW series, B series or the like) manufactured by Mitsui Chemicals, Inc.

The melamine compound is a methylolated melamine compound or a methoxy methylolated melamine compound, which have two or more methylol groups or methoxy methylol groups in one molecule, and commercial products thereof include, for example, YUBAN (registered trademark) series (including YUBAN (registered trademark) 120, 20HS, 2021, 2028, 228, 2860, and 22R) manufactured by Mitsui Chemicals, Inc., CYMEL (registered trademark) series (including CYMEL (registered trademark) 202, 232, 235, 238, 254, 266, 267, 272, 285, 301, 303, 325, 327, 350, 370, 701, 703, 736, 738, 771, 114, 1156, and 1158) manufactured by Scitex Japan K.K., and SUMIMAL (registered trademark) series (including SUMIMAL (registered trademark) M-30W, M-50W, M-55, M-66B, and 50B) manufactured by Sumitomo Chemical Co., Ltd.

The oxazoline compound has two or more oxazoline groups (oxazoline backbones) in one molecule, and examples include compounds having two or more oxazoline groups such as 2,2'-isopropylidene bis(4-phenyl-2-oxazoline); (co)polymers of polymerizable oxazoline compounds including 2-isopropenyl-2-oxazoline, 2-vinyl-2-oxazoline, and 2-vinyl-4-methyl-2-oxazoline; and copolymers of the polymerizable oxazoline compounds and copolymerizable monomers not reactive to oxazoline groups ((meth)acrylic esters such as methyl (meth)acrylate, ethyl (meth)acrylate, hydroxyethyl (meth)acrylate, and polyethylene glycol (meth)acrylate; methacrylamide/vinyl acetate, styrene, and α-methylstyrene/sodium styrenesulfonate; and the like).

Commercial products of oxazoline compounds include (EPOCROS (registered trademark) K-2010E), (EPOCROS (registered trademark) K-2020E), (EPOCROS (registered trademark) WS-500), or the like manufactured by Nippon Shokubai Co., Ltd.

The carbodiimide compound has two or more carbodiimide groups on one molecule, and useful examples include aliphatic polycarbodiimides (such as poly(hexamethylene carbodiimide)), alicyclic polycarbodiimides (such as poly (4,4'-dicyclohexyl methane carbodiimide)), and aromatic polycarbodiimides (such as poly(p-phenylene carbodiimide), poly(4,4'-diphenyl methane carbodiimide), and poly (diisopropyl phenyl carbodiimide)) that can be obtained by polymerization of the aforementioned aromatic polyisocyanate containing 8 to 26 carbon atoms, aliphatic polyisocyanates containing 4 to 22 carbon atoms, alicyclic polyisocyanates containing 8 to 18 carbon atoms, or araliphatic polyisocyanates containing 10 to 18 carbon atoms.

Commercial products of carbodiimide compounds include (CARBODILITE (registered trademark) V-01), (CARBODILITE (registered trademark) V02), (CARBODILITE (registered trademark) V-03), (CARBODILITE V-04), (CARBODILITE (registered trademark) V-05), (CARBODILITE (registered trademark) V-07), (CARBODILITE (registered trademark) V-09), (CARBODILITE (registered trademark) E-02), (CARBODILITE (registered trademark) E-03A), and (CARBODILITE (registered trademark) E-04) manufactured by Nisshinbo Industries, Inc.

The aziridine compound has two or more aziridinyl groups in one molecule, and examples include tetramethylolmethane tris-(β-aziridinyl propionate) and trimethylolpropane tris-(β-aziridinyl propionate).

The epoxy compound has two or more epoxy groups in one molecule, examples include phenyl glycidyl ether, resorcinol diglycidyl ether, neopentyl glycol diglycidyl ether, 1,6-hexanediol diglycidyl ether, glycerol polyglycidyl ether, hydrogenated bisphenol A diglycidyl ether, trimethylolpropane polyglycidyl ether, pentaerythritolpolyglycidyl ether, and polypropylene glycol diglycidyl ether.

The hydrazine compound may be hydrazine or a compound having two or more hydrazine groups (hydrazine backbones) in one molecule (for example, dicarboxylic acid dihydrazides containing 2 to 10 carbon atoms (such as oxalic acid dihydrazide, malonic acid dihydrazide, succinic acid dihydrazide, glutaric acid dihydrazide, adipic acid dihydrazide, sebacic acid dihydrazide, maleic acid dihydrazide, fumaric acid dihydrazide, and itaconic acid dihydrazide) and alkylene dihydrazines containing 2 to 10 carbon atoms (such as ethylene dihydrazine, 1,3-propylene dihydrazine, 1,4-butylene dihydrazine, and 1,6-hexylene dihydrazine)).

After introducing a sulfo group, carboxyl group, hydroxyl group, or primary or secondary amino group into the polyurethane resin, an aforementioned compound having appropriate reactivity can be used as crosslinking agent.

With respect to the functional group contained in the polyurethane resin, the carboxyl group is preferred as the functional group from the viewpoint of crosslinking reaction rate, and the oxazoline compounds and carbodiimide compounds are preferred as the crosslinking agent.

With respect to the quantity of the crosslinking agent, it is preferable for the number of moles of the reactive group present in the crosslinking agent to be 0.05 to 2.0 times, more preferably 0.1 to 1.0 times, as large as the number of moles of the reactive group present in the polyurethane resin. The crosslinking reaction will be slow when the quantity of the crosslinking agent is less than 0.05 times that of the reactive group present in the polyurethane resin, whereas a large part of the crosslinking agent will be left unreacted and large production cost will be required when it is more than 2.0 times.

The molecular weight of the crosslinking agent per reactive group is preferably 100 to 800 from the viewpoint of the mechanical strength, weather resistance, and flexibility of the resin.

Various additives may be added to a polyurethane resin composition prepared by dissolving or dispersing the polyurethane resin in an aforementioned solvent, and they include pigments such as carbon black; antioxidants (such as hindered phenolic based, sulfur based, and phosphorous based antioxidants); ultraviolet absorbers (such as benzotriazole based, triazine based, benzophenone based, and benzoate based ultraviolet absorbers); weathering stabilization agents such as hindered amine based photostabilizers; flexible water repellent agents (such as polysiloxane, modified silicone oil, other silicone compounds, polymers based on fluoroalkyl esters of acrylic acids, and other fluorine compound based flexible water repellent agents); wetting agents (such as ethylene glycol, diethylene glycol, propylene glycol, and glycerin based wetting agents); antifoam agents (such as octyl alcohol, sorbitan monooleate, polydimethyl siloxane, polyether modified silicone, and fluorine modified silicone based antifoam agents); fillers (such as fine particles of calcium carbonate, titanium oxide, silica, talc, ceramics, or resin, and hollow bead type fillers); flame retardants (such as halogen based, phosphorus based, antimony based, melamine based, guanidine based, guanylurea based, silicone based, and other inorganic flame retardants); foaming agents (examples include dinitrosopentamethylene tetramine (such as CELMIKE A (registered trademark) manufactured by Sankyo Kasei Co., Ltd.), azodicarbonamide (such as CELMIKE CAP (registered trademark) manufactured by Sankyo Kasei Co., Ltd.), p,p'-oxy bisbenzenesulfonyl hydrazide (such as CELMIKE S (registered trademark) manufactured by Sankyo Kasei Co., Ltd.), N,N'-dinitrosopentamethylene tetramine (such as Cellular GX manufactured by Eiwa Chemical Ind. Co., Ltd.), other organic foaming agents, sodium hydrogen carbonates (such as CELMIKE 266 (registered trademark) manufactured by Sankyo Kasei Co., Ltd.), and other inorganic foaming agents); viscosity adjustors; plasticizers (such as phthalic esters, and adipic esters); and mold releasing agents (wax based, metal soap based, and their mixture based mold releasing agents).

To provide a sheet like article with flexible and highly crease recoverable texture along with high durability and light resistance, it is important for the polyurethane resin to contain, in its interior, an oxycarbonyl group and carbonate group as ester groups, and another important point is as follows.

First, from the viewpoint of the mechanical strength, flexibility, and crease recoverability of the polyurethane resin, it is necessary that the sum of the content of the urethane group and the content of the urea group in the polyurethane resin be 7.0 to 11.0 mass %, preferably 7.5 to 10.0 mass %. If the sum of the concentration of the urethane group and the concentration of the urea group is less than 7.0%, creases may remain though a flexible texture can be obtained, whereas if it is more than 11.0 mass %, the flexibility will be low though the crease recoverability can be high. From the viewpoint of the mechanical strength and flexibility of the polyurethane resin, furthermore, the content of the urea group is preferably 1.0 to 4.0 mass %, more preferably 1.5 to 3.0 mass %.

Preferably, the storage elastic modulus E' of the polyurethane resin film at a temperature of 20° C. is 1 to 70 MPa, more preferably 5 to 40 MPa, from the viewpoint of flexibility and impact resilience, and the value of tan δ is preferably 0.05 to 0.3, more preferably 0.06 to 0.2.

The storage elastic modulus E' and tan δ are determined for a film of polyurethane resin with a film thickness of 200 μm using a storage elastic modulus measuring apparatus (Rheogel E4000, manufactured by UBM) at a frequency of 11 Hz. tan δ is calculated as E"/E' (E" represents the loss elastic modulus).

If the polyurethane resin is free of crosslinked structures and soluble in organic solvents to enable Mn measurement, Mn of the polyurethane resin is preferably 10,000 to 1,000,000, more preferably 10,000 to 500,000, particularly preferably 10,000 to 400,000, and most preferably 10,000 to 250,000, from the viewpoint of the mechanical strength and weather resistance of the resin.

Mn of polyurethane resin may be measured by gel permeation chromatography using, for example, HLC-8220GPC manufactured by Tosoh Corporation under the conditions of using DMF as solvent, polystyrene as reference material, a sample concentration of 0.125 mass %, Guardcolumn a and TSKgel α-M (both manufactured by Tosoh Corporation) as stationary phase in the column, and a column temperature of 40° C.

It is preferable for the density of the sheet like article to be 0.2 to 0.7 g/cm$^3$. The sheet like article should more preferably have a density of 0.2 g/cm$^3$ or more, still more preferably 0.3 g/cm$^3$ or more, to have a dense surface appearance and high-grade quality. On the other hand, if the sheet like article has a density of preferably 0.7 g/cm$^3$ or less, more preferably to 0.6 g/cm$^3$ or less, it serves to prevent the texture of the sheet like article from becoming stiff.

It is preferable for the polyurethane resin in the sheet like article to account for 10% to 80% by mass. If the content of the polyurethane resin is 10 mass % or more, more preferably 15 mass % or more, a sheet like article with sufficient strength can be obtained and fibers can be prevented from falling off. Furthermore, if the content of the polyurethane resin is preferably 80% by mass or less, more preferably 70% by mass or less, the texture can be prevented from becoming stiff and good raised fiber quality can be obtained.

The compressibility of the sheet like article is preferably 13% or more and 20% or less and its compression modulus is preferably 55% or more and 75% or less. If the sheet like article has a compressibility and a compression modulus in the above ranges, it will be possible to obtain a sheet like article having a highly natural leather like texture.

If the fibrous base material is impregnated with a polyurethane resin having specific characteristics, the resulting sheet like article will have uniform product appearance, elegant surface quality, good texture, and durability.

Specifically, the sheet like article is produced by adding, as a binder, a polyurethane resin that meets the requirements (I) and (II) to a fibrous base material that contains ultrafine fibers.

(I) A polyurethane resin such that the polyurethane resin contains, in its interior, an oxycarbonyl group and a carbonate group as ester groups.

(II) A polyurethane resin such that the sum of the content of the urethane group and the content of the urea group in the polyurethane resin is 7.0 to 11.0 mass %.

Production Method for Sheet Like Article

Described below are production methods for the sheet like article

Fibrous base materials that can be used favorably include cloth such as woven fabric, knitted fabric, and nonwoven fabric. Among others, the use of a nonwoven fabric is preferable because the sheet like article will have good surface quality after being subjected to surface fiber raising treatment. The fibrous base material may be a laminate containing layers of these woven fabric, knitted fabric, or nonwoven fabric.

The nonwoven fabric may be either short-fiber nonwoven fabric or long-fiber nonwoven fabric, but short-fiber nonwoven fabric is preferred because good surface quality attributed to raised fibers with a uniform length is obtained.

The short fibers in the short-fiber nonwoven fabric preferably have a fiber length of 25 mm to 90 mm, more preferably 35 mm to 75 mm. A fiber length of 25 mm or more makes it possible to obtain a sheet like article that has high abrasion resistance due to entanglement. Furthermore, controlling the fiber length at 90 mm or less makes it possible to obtain a sheet like material with further improved quality.

The fibers for use to form the fibrous base material may be of a melt-spinnable thermoplastic resin such as polyesters including polyethylene terephthalate, polybutylene terephthalate, polytrimethylene terephthalate, and polylactic acid; polyamides including 6-nylon and 66-nylon; and others including acrylic, polyethylene, polypropylene, and thermoplastic cellulose. Particularly, it is preferable to use polyester fibers from the viewpoint of strength, dimensional stability, and light resistance. Furthermore, the fibrous base material may be produced by mixing fibers of different materials.

The cross-sectional shape of the ultrafine fibers may be circular, and it also may be a deformed shape such as elliptic, flat, polygonal such as triangular, fan-shaped and cross.

The average fiber diameter of the ultrafine fibers constituting the fibrous base material is preferably 0.3 to 7 µm, more preferably 0.8 to 5 µm. An average ultrafine fiber diameter of 7 µm or less allows the fibrous base material to have a more flexible feel. An average fiber diameter of 0.3 µm or more, on the other hand, ensures improved color development after dyeing.

When the fibrous base material is a nonwoven fabric, a woven fabric or a knitted fabric may be combined with the nonwoven fabric to improve strength or the like. The combination of a nonwoven fabric with a woven fabric or knitted fabric may be achieved by laminating a nonwoven fabric with a woven fabric or knitted fabric, or inserting a woven fabric or knitted fabric into a nonwoven fabric. In this case, it is preferable, among others, to use a woven fabric from the viewpoint of expected improvement in morphological stability and strength.

Single yarns (warp and weft) that constitute the woven or knitted fabric may be of synthetic fiber such as polyester fiber and polyamide fiber, but these single yarns are preferably of the same fiber material as the ultrafine fibers that finally constitute the cloth such as nonwoven fabric, from the viewpoint of dyeing fastness.

With respect to the type of these single yarns, they may be filament yarns or spun yarns, and they are preferably in a hard twist form. In particular, the use of filament yarns is preferable because spun yarns are likely to suffer a loss of surface fuzzing.

When hard twist yarns are to be used, their twist count is preferably 1,000 T/m or more and 4,000 T/m or less, more preferably 1,500 T/m or more and 3,500 T/m or less. If the twist count is less than 1,000 T/m, the hard twist yarns will suffer more frequent breakage of constituent single fibers during the needle punching treatment, leading to products with deteriorated physical characteristics and exposure of many single fibers from the product surface. If the twist count is more than 4,000 T/m, on the other hand, breakage of single fibers can be depressed, but the hard twist yarns that constitute the woven fabric or knitted fabric will become too stiff, tending to results in a hard texture.

The hard twist yarns preferably have a diameter of 80 µm or more and 200 µm or less, more preferably 120 µm or more and 180 µm or less. The use of a twist single yarn with a diameter of less than 80 µm leads to a larger strain in the woven or knitted fabric as it is shrunk in the dyeing step. The use of a twist single yarn with a diameter of more than 200 µm can serve to depress the strain in the woven or knitted fabric as it is shrunk in the dyeing step, but sufficient entanglement will not be created by needle punching treatment between the nonwoven fabric web and the woven or knitted fabric, tending to lead to a product with a decreased morphological stability.

The hard twist yarns preferably have a monofilament fineness of 0.5 μm or more and 20.0 μm or less, more preferably 2.0 μm or more and 15.0 μm or less. If the monofilament fineness is less than 0.5 monofilament breakage will occur frequently during needle punching treatment, leading to a product with deteriorated physical characteristics. If the monofilament fineness is more than 20.0 fibers constituting the woven or knitted fabric may be exposed significantly through the product surface, leading to deterioration in product quality, as a result of a difference in dyeability from the ultrafine fibers constituting the nonwoven fabric.

Furthermore, the use of ultrafine fiber-developing type fibers for the fibrous base material production is preferable. The use of ultrafine fiber-developing type fibers for the fibrous base material production serves for stable formation of entangled bundles of the ultrafine fibers described above.

When the fibrous base material is a nonwoven fabric, it is preferable for the nonwoven fabric to have a structure formed by the entanglement of bundles (fiber bundles) of ultrafine fibers. The entanglement of bundles of ultrafine fibers allows the sheet like article to have improved strength. Such a nonwoven fabric can be produced by entangling ultrafine fiber-developing type fibers first and then developing ultrafine fibers.

Ultrafine fiber-generating type fibers that can be used include: sea-island type composite ones produced by using two thermoplastic resins different in solubility in a solvent as sea component and island component and dissolving and removing the sea component by using a solvent or the like to allow the island component to be left to form ultrafine fibers; and splittable type composite ones produced by alternately disposing two thermoplastic resins, radially in the cross section or in layers, and splitting and separating the two components to form ultrafine fibers.

In particular, sea-island type composite fibers are preferred from the viewpoint of the flexibility and texture of the resulting sheet like article because the removal of the sea regions will leave moderate gaps among island regions, i.e., among ultrafine fibers.

Island-in-sea type composite fibers include sea-island type composite fibers produced by using a spinneret designed for sea-island type composite fibers to spin fibers so that two components, i.e. sea and island, are mutually arrayed, and blend-spun fibers produced by spinning a mixture of two components for sea and island, of which the sea-island type composite fibers have been used favorably because they can serve to produce ultrafine fibers with uniform fineness and also produce ultrafine fibers with an adequate length to ensure the production of a sheet like article with increased strength.

Usable materials for the sea component of sea-island type composite fibers include polyethylene, polypropylene, polystyrene, polyester copolymers of sodium sulfoisophthalic acid, polyethylene glycol, or the like, polylactic acid, and polyvinyl alcohol (hereinafter, occasionally referred to as PVA). Particularly preferable are copolymerized polyester produced from, for example, sodium sulfoisophthalic acid and polyethylene glycol, both of which are alkali resolvable and capable of being decomposed without using an organic solvent, and also preferable are polylactic acid, and PVA that is soluble in hot water.

With respect to the ratio between the sea component and the island component in sea-island type composite fiber, it is preferable for the island fiber to account for 0.2 to 0.8, more preferably 0.3 to 0.7, by mass of the sea-island type composite fiber. If the mass ratio is 0.2 or more, it ensures a small sea component removal ratio and leads to improved productivity. If the mass ratio is 0.8 or less, the fiber-opening capability of the island fiber will improve, and confluence of streams of the island component can be prevented. The number of island component streams can be controlled by appropriately adjusting the spinneret design.

The monofilament fineness of the ultrafine fiber-developing type fiber such as sea-island type composite fiber, is preferably 5 to 80 μm, more preferably 10 to 50 μm. If the monofilament fineness is less than 5 μm, the fiber will be low in strength and tends to suffer from filament breakage during treatment steps such as needle punching described later. If the monofilament fineness is more than 80 μm, on the other hand, treatment steps such as needle punching may fail to produce entanglement efficiently.

Adoptable methods of obtaining a nonwoven fabric that can be used as fibrous base material include entangling a fiber web by needle punching treatment or water jet punching treatment, as well as spunbonding, meltblowing, and the use of papermaking technique, of which needle punching treatment and water jet punching treatment have been used favorably to produce ultrafine fiber bundles such as described above.

To produce an integrated laminate of a woven fabric or knitted fabric and a nonwoven fabric to be used as fibrous base material, needle punching treatment, water jet punching treatment or the like, are used favorably from the viewpoint of efficient entanglement of fibers. In particular, needle punching treatment is used favorably from the viewpoint of orienting the fibers in the vertical direction in the fibrous base material regardless of the thickness of the sheet.

Needles having 1 to 9 barbs are used favorably for the needle punching treatment. The use of a needle having at least one barb allows fibers to be entangled efficiently. The use of a needle having 9 or less barbs, on the other hand, prevents fibers from being damaged significantly. The use of a needle having more than 9 barbs will lead to significant fiber damage and deterioration in product appearance due to needle marks left on the fibrous base material.

In view of the influence on the fiber entanglement efficiency and product appearance, furthermore, the total depth of each barb (the length from the barb end to the barb bottom) is preferably 0.05 to 0.10 mm. A total barb depth of 0.05 mm or more permits efficient entangling of fibers because fiber bundles are caught firmly. If the total barb depth is more than 0.10 mm, fibers will be brought in large amounts into the interior of the fibrous base material and needle marks will tend to be left on the fibrous base material, leading to quality deterioration. In view of the balance between the barb strength and fiber entanglement, the total barb depth is preferably 0.06 mm or more and 0.08 mm or less.

If a nonwoven fabric is to be integrated with a woven fabric or knitted fabric by entanglement, it is preferable for the nonwoven fabric to have preliminary entanglement, which serves to prevent significant crease generation when inseparably combining the nonwoven fabric with a woven fabric or knitted fabric by needle punching treatment. Thus, when a method designed to develop preliminary entanglement in advance by needle punching treatment is adopted, it is effective to perform it with a punching density of 20 punches/cm$^2$ or more. It is preferable for the preliminary entanglement to be performed with a punching density of 100 punches/cm$^2$ or more, and it is more preferable for the preliminary entanglement to be performed with a punching density of 300 punches/cm² to 1,300 punches/cm².

This is because if the punching density for preliminary entanglement is less than 20 punches/cm², the width of the nonwoven fabric can decrease during the steps of entanglement with a woven fabric or knitted fabric and subsequent needle punching treatment, possibly making it impossible to obtain a fibrous base material with a smooth surface due to creases in the woven fabric or knitted fabric attributable to the change in the width. If the punching density for preliminary entanglement is more than 1,300 punches/cm², on the other hand, the entanglement in the nonwoven fabric itself generally proceeds to an excessive degree and the fibers will not be able to move easily to realize sufficient entanglement with the fibers in the woven fabric or knitted fabric, which is disadvantageous in achieving a inseparably integrated structure in which the nonwoven fabric and the woven fabric or knitted fabric are entangled strongly.

When fibers are entangled by needle punching treatment, the punching density is preferably 300 punches/cm² to 6,000 punches/cm², more preferably 1,000 punches/cm² to 3,000 punches/cm², regardless of whether a woven fabric or knitted fabric exists or not.

To get a nonwoven fabric entangled with a woven fabric or knitted fabric, woven or knitted fabric layers are laid over one or both sides of the nonwoven fabric, or woven or knitted fabric layers are inserted between a plurality of nonwoven fabric layers, followed by needle punching to cause entanglement of fibers to provide a fibrous base material.

When performing water jet punching, it is preferable to use water in a columnar form. Specifically, water is preferably squirted through a nozzle with a diameter of 0.05 to 1.0 mm under a pressure of 1 to 60 MPa.

The nonwoven fabric of ultrafine fiber-generating type fibers obtained after needle punching or water jet punching treatment preferably has an apparent density of 0.150 to 0.450 g/cm³, more preferably 0.200 to 0.300 g/cm³. An apparent density of 0.150 g/cm³ or more makes it possible to produce artificial leather having sufficiently high morphological stability and dimensional stability. An apparent density of 0.450 g/cm³ or less, on the other hand, serves to maintain adequate spaces to accommodate a polymer elastomer.

To ensure a denser surface, it is preferable for the nonwoven fabric formed of ultrafine fiber-generating fibers obtained as described above to be shrunk by dry heat and/or wet heat to achieve a higher fiber density.

When a sea-island type composite fiber is employed, the sea removal treatment may be carried out before the addition of a polyurethane resin composition to the fibrous base material or after the addition. If sea removing treatment is performed before adding a polyurethane resin composition, the polyurethane resin will be in direct contact with the ultrafine fibers in the resulting structure to allow the ultrafine fibers to be firmly grasped, leading to a sheet like article with high wear resistance. On the other hand, if the sea removal step is carried out after the addition of a polyurethane resin composition, spaces attributed to the removed sea component will be formed between the polyurethane resin and ultrathin fibers so that the ultrafine fibers will not be held by the polyurethane resin, leading to a sheet like article having a soft texture.

The sea removal treatment can be carried out by immersing the fibrous base material containing the sea-island type composite fiber in a liquid in a solvent and then squeezing the liquid. Solvents useful to dissolve the sea component include organic solvents such as toluene and trichloroethylene for a sea component of polyethylene, polypropylene, or polystyrene; alkaline solutions such as aqueous sodium hydroxide solution for a sea component of copolymerized polyester or polylactic acid; and hot water for a sea component of PVA.

The addition of PVA to the fibrous base material is carried out either before or after the sea removal treatment and before the addition of a polyurethane resin composition to the fibrous base material. When addition of PVA is carried out first, subsequently followed by sea removal treatment, impregnation with a polyurethane resin composition, and then the removal of PVA, gaps attributed to the removal of PVA and gaps attributed to the removal of the sea component are formed together between the polyurethane resin and the ultrafine fibers and, accordingly, the area where the ultrafine fibers directly held by the polyurethane decreases, leading to a sheet like article with a flexible texture.

If the sea removal treatment is performed with hot water or an aqueous alkali solution such as aqueous sodium hydroxide solution in such a case, the use of a PVA material with a saponification degree of 98% or more and a polymerization degree of 500 to 3,500 serves to prevent the elution of the PVA during sea removal treatment. On the other hand, when sea removal treatment is carried out first, subsequently followed by the addition of PVA, sea removal treatment, and then addition of a polyurethane resin composition, the PVA will adhere around the ultrafine fibers after the ultrafining treatment, followed by adhesion of polyurethane and subsequent removal of PVA. As in the above case, the area where the ultrafine fibers are held by the polyurethane resin also tends to decrease, leading to a sheet like article with a flexible texture.

The thickness of the fibrous base material is preferably 0.3 mm or more and 6.0 mm or less, more preferably 1.0 mm or more and 3.0 mm or less. If the thickness of the fibrous base material is less than 0.3 mm, the resulting sheet like article may suffer from poor morphological stability. A thickness of more than 6.0 mm tends to lead to frequent occurrence of needle breakage in the needle punching step.

Production Method for Polyurethane

Described next is the production method for polyurethane resin.

Available methods of production of an organic solvent based polyurethane resin include, for example, performing a reaction between an active hydrogen component and an organic polyisocyanate component in an aforementioned organic solvent.

Available organic solvents that can be used as the solvent include ketone based solvents (such as acetone, methyl ethyl ketone, and methyl isobutyl ketone), ester based solvents (such as ethyl acetate, butyl acetate, and γ-butyrolactone), ether based solvents (such as THF), amide based solvents (such as N,N-dimethyl formamide (hereinafter, occasionally abbreviated as DMF), N,N-dimethyl acetamide, N-methyl-2-pyrolidone, and N-methyl caprolactam), alcohol based solvents (such as methanol, ethanol, and isopropyl alcohol), and aromatic hydrocarbon based solvents (such as toluene and xylene). These organic solvents may be used either singly or as a combination of two or more thereof. Of these organic solvents, amide based solvents are preferable from the viewpoint of solubility of polyurethane resin.

To perform the reaction, common reaction methods generally used for the production of polyurethane resin may be applied, including a method in which an active hydrogen component, an organic polyisocyanate component, and an organic solvent are fed together in a reaction container and reacted in a single step, a method in which an active hydrogen component and an organic polyisocyanate component are divided and subjected to multi-stage reaction in the presence of an organic solvent, and a method in which an active hydrogen component, an organic polyisocyanate, and an organic solvent are mixed in advance and allowed to pass through a heated multiple screw extruder to undergo a reaction.

The reaction temperature is normally 30° C. to 180° C., preferably 60° C. to 120° C. To promote the urethanation reaction, a catalyst commonly used for urethanation reaction may be used as required.

Useful catalysts include, for example, amine catalysts such as triethyl amine, N-ethyl ethylmorpholine, triethylene diamine, and cycloamidines as specified in U.S. Pat. No. 4,524,104 (1,8-diaza-bicyclo[5,4,0]-7-undecene (DBU, manufactured by San-Apro Ltd.) or the like); tin based catalysts such as dibutyltin dilaurate, dioctyltin dilaurate, and tin octylate; titanium based catalysts such as tetrabutyl titanate; and bismuth based catalysts such as bismuth trioctylate.

Preferably, the polyurethane resin is produced by coagulating an aqueous dispersion of polyurethane. The use of a polyurethane material produced by coagulating an aqueous dispersion of polyurethane resin serves to provide a sheet like article by a technique free of an organic solvent that is highly harmful to the human body and environment.

If polyurethane resin in the form of particles is dispersed in an aqueous medium, a compound having a hydrophilic group and active hydrogen is preferably adopted as a component of the polyurethane resin from the viewpoint of dispersion stability of the polyurethane resin, and the use of a neutralized salt is more preferable.

Neutralization agents that can be used to produce a neutralized salt of a compound containing a hydrophilic group and active hydrogen include ammonia, amine compounds containing 1 to 20 carbon atoms, and hydroxides of alkali metals (such as sodium, potassium, and lithium).

Examples of the amine compounds containing 1 to 20 carbon atoms include monomethyl amine, monoethyl amine, monobutyl amine, monoethanol amine, 2-amino-2-methyl-1-propanol, other primary amines, dimethyl amine, diethyl amine, dibutyl amine, diethanol amine, N-methyl diethanol amine, other secondary amines, trimethyl amine, triethyl amine, dimethylethyl amine, triethanol amine, and other tertiary amines.

Of these, neutralization agents preferable from the viewpoint of odor and water resistance of the polyurethane resin composition include amine compounds low in vapor pressure at a temperature of 25° C., and more preferable neutralization agents include triethyl amine, monoethanol amine, diethanol amine, and N-methyl diethanol amine.

In addition to the above substances, useful neutralization agents also include monocarboxylic acid containing 1 to 10 carbon atoms (such as formic acid, acetic acid, propane acid, and lactic acid), carbonic acid, hydrochloric acid, phosphoric acid, sulfuric acid, dimethyl carbonate, dimethyl sulfate, methyl chloride, and benzyl chloride. Of these, neutralization agents preferable from the viewpoint of odor of the polyurethane resin include carbonic acid and phosphoric acid.

Of the compounds containing a hydrophilic group and active hydrogen useful to prepare aqueous dispersions of polyurethane resin, those compounds preferable from the viewpoint of mechanical strength and dispersion stability of polyurethane resin include 2,2-dimethylol propionic acid, 2,2-dimethylol butane acid, and neutralization salts thereof, and more preferable compounds include neutralization salts of 2,2-dimethylol propionic acid and 2,2-dimethylol butane acid neutralized with amine compounds.

Neutralization agents used for compounds containing a hydrophilic group and active hydrogen may be added before the urethanation reaction, during the urethanation reaction, after the urethanation reaction, before the step for dispersion in an aqueous medium, during the step for dispersion in an aqueous medium, or after the step for dispersion in an aqueous medium, but from the viewpoint of the stability of the polyurethane resin and the stability of the aqueous dispersion, it is preferable for the addition to be performed before the step for dispersion in an aqueous medium or during the step for dispersion in an aqueous medium.

When using a compound containing a hydrophilic group and active hydrogen, the content of the carboxyl groups and/or salts thereof and sulfonic acid groups and/or salts thereof relative to the mass of the polyurethane resin is preferably 0.01 to 10 mass %, more preferably 0.02 to 5 mass %, from the viewpoint of the dispersion stability and water resistance of the polyurethane resin.

When the polyurethane resin is dispersed as particles in an aqueous medium, a surface active agent may be used instead of a compound containing a hydrophilic group and active hydrogen or in addition to a compound containing a hydrophilic group and active hydrogen to disperse polyurethane resin in an aqueous medium.

Examples of the surface active agent include nonionic surface active agents, anionic surface active agents, cationic surface active agents, amphoteric surface active agents, and other emulsifying dispersion agents. These surface active agents may be used singly or as a combination of two or more thereof.

Examples of the nonionic surface active agents include, for example, AO addition type nonionic surface active agents and polyhydric alcohol type nonionic surface active agents. AO addition type nonionic surface active agents include EO adducts of aliphatic alcohols containing 10 to 20 carbon atoms, EO adducts of phenols, EO adducts of nonyl phenols, EO adducts of alkyl amines containing 8 to 22 carbon atoms, and EO adducts of polypropylene glycol. Examples of the polyhydric alcohol type nonionic surface active agents include fatty acids (containing 8 to 24 carbon atoms) esters of polyhydric (trihydric to octahydric or higher) alcohols (containing 2 to 30 carbon atoms) (such as glycerin monostearate, glycerin monooleate, sorbitan monolaurate, and sorbitan monooleate) and alkyl (containing 4 to 24 carbon atoms) polyglycoside (polymerization degree 1 to 10).

Examples of the anionic surface active agents include, for example, ether carboxylic acids having a hydrocarbon group containing 8 to 24 carbon atoms and salts thereof (such as lauryl ether sodium acetate and (poly)oxyethylene (1 to 100 moles added) lauryl ether sodium acetate); sulfates and ether sulfates having a hydrocarbon group containing 8 to 24 carbon atoms, and salts thereof (such as sodium lauryl sulfate, sodium (poly)oxyethylene (1 to 100 moles added) lauryl sulfate, triethanolamine (poly)oxyethylene (1 to 100 moles added) lauryl sulfate, and (poly)oxyethylene (1 to 100 moles added) coconut oil fatty acid monoethanolamide sodium sulfate); sulfonates having a hydrocarbon group containing 8 to 24 carbon atoms (such as sodium dodecylbenzene sulfonate); sulfosuccinates having one or two hydrocarbon groups containing 8 to 24 carbon atoms; phosphates or ether phosphates having a hydrocarbon group containing 8 to 24 carbon atoms, and salts thereof (such as sodium lauryl phosphate and sodium (poly)oxyethylene (1 to 100 moles added) lauryl ether phosphate); fatty acid salt having a hydrocarbon group containing 8 to 24 carbon atoms (such as sodium laurate and triethanolamine laurate); and acylated amino acid salts having a hydrocarbon group containing 8 to 24 carbon atoms (such as sodium coconut oil fatty acid methyltaurine, sodium coconut oil fatty acid sarcosine, coconut oil fatty acid sarcosine triethanolamine, N-coconut oil fatty acid acyl-L-glutamate triethanolamine, N-coconut oil fatty acid acyl-L-glutamate sodium, and sodium lauroyl methyl-β-alanine).

Examples of the cationic surface active agents include, for example, quaternary ammonium salt type (such as stearyl trimethyl ammonium chloride, behenyl trimethyl ammonium chloride, distearyl dimethyl ammonium chloride, and ethyl sulfuric acid lanolin fatty acid aminopropylethyl dimethyl ammonium), and amine salt type (such as stearic acid diethylaminoethylamide lactate, dilaurylamine hydrochloride, and oleylamine lactate).

Examples of the amphoteric surface active agents include, for example, betaine type amphoteric surface active agents (betaine coconut oil fatty acid amidepropyl dimethyl aminoacetate, betaine lauryldimethyl aminoacetate, 2-alkyl-N-carboxymethyl-N-hydroxyethylimidazolinium betaine, lauryl hydroxysulfobetaine, and lauroyl amide ethyl hydroxyethyl carboxymethyl betaine hydroxypropyl phosphate sodium) and amino acid amphoteric surface active agents (such as sodium β-laurylamino propionate).

Other emulsifying dispersion agents include, for example, PVA, starch and derivatives thereof, carboxymethyl cellulose, methyl cellulose, hydroxyethyl cellulose, other cellulose derivatives, sodium polyacrylate, other carboxyl group-containing (co)polymers, and emulsifying dispersion agents having a urethane group or an ester group specified in U.S. Pat. No. 5,906,704 (such as compounds in the form of a combination of polycaprolactone polyol and polyether diol connected by a polyisocyanate).

Such a surface active agent may added before the polyurethane resin's urethanation reaction, during the urethanation reaction, after the urethanation reaction, before the step for dispersion of polyurethane resin in water, during the step for dispersion in water, or after the step for dispersion in water, but from the viewpoint of the dispersibility of the polyurethane resin and the stability of the aqueous dispersion, it is preferable for the addition to be performed before the step for dispersion in water or during the step for dispersion in water.

From the viewpoint of the water resistance of the dried film, the content of the surface active agent is preferably 0 to 20 mass %, more preferably 0.1 to 10 mass %, and particularly preferably 0.2 to 5 mass %, relative to the mass of the polyurethane resin.

Available production methods for aqueous dispersions of polyurethane resin include, for example, the methods (1) and (2) described below. Useful aqueous mediums include water and mixtures with organic solvents that can be applied to solvents for organic solvent based polyurethane. From the viewpoint of dispersibility, preferable organic solvents that can be used for aqueous mediums include water-soluble organic solvents.

(1) Active hydrogen components such as polymeric polyol, compound containing a hydrophilic group, and if necessary, chain extender and reaction terminator are reacted with an organic polyisocyanate component in a single stage or multiple stages in the presence of or in the absence of an organic solvent to form a polyurethane resin, and if necessary, converted into a salt by treating the hydrophilic group part, which has been introduced into the compound containing a hydrophilic group and active hydrogen, with a neutralization agent, and dispersed in an aqueous medium in the presence of or in the absence of an organic solvent and/or surface active agent.

(2) Active hydrogen components such as polymeric polyol, compound containing a hydrophilic group, and if necessary, chain extender and reaction terminator are reacted with an organic polyisocyanate component in a single stage or multiple stages in the presence of or in the absence of an organic solvent to form a urethane prepolymer, which is, if necessary, converted into a salt by neutralizing the hydrophilic group in the resulting urethane prepolymer and the hydrophilic group part, which has been introduced with the compound containing a hydrophilic group and active hydrogen. It is then dispersed in an aqueous medium in the presence of or in the absence of an organic solvent, surface active agent, chain extender and/or chain terminator, and the reaction (chain extension with water and/or chain extender and, if necessary, chain termination with a reaction terminator) is maintained until the isocyanate group is substantially used up.

For the urethanation reaction in the methods (1) and (2), the catalysts described above can be applied to promote the reaction.

The quantity of the aqueous medium in the aqueous dispersion of the polyurethane resin is adjusted so that the concentration of the urethane resin in the aqueous dispersion is preferably 15 to 70 mass %, more preferably 20 to 60 mass %, from the viewpoint of dispersion stability and transport cost.

From the viewpoint of storage stability and viscosity, the polyurethane resin in the aqueous dispersion of polyurethane resin preferably has a volume average particle diameter of 0.01 to 1 μm, more preferably 0.02 to 0.7 μm, and particularly preferably 0.03 to 0.5 μm.

The polyurethane resin is added to a fibrous base material by, for example, immersing a fibrous base material in a polyurethane resin composition prepared by dissolution or dispersion in an aforementioned solvent, followed by drying to achieve coagulation and solidification.

In an organic solvent based polyurethane resin, coagulation can be achieved by immersion in a solvent in which it is insoluble. A coagulation method that adopts immersion in a water-dispersion type polyurethane resin can be applied to dry-heat, moist-heat, and wet coagulation, and if a water-dispersion type polyurethane is combined with a thermosensitive coagulation agent, thermosensitive coagulability can be added to the polyurethane resin. If moist-heat coagulation is further adopted, migration of the polyurethane resin can be depressed to ensure uniform impregnation of the fibrous base material with the polyurethane resin.

Examples of the thermosensitive coagulation agent include organic acid salts, inorganic salts, polyvinyl methyl ether, silicone polyether copolymers, and polysiloxane.

Examples of the organic acid salts include neutralized salts between a carboxylic acid containing 1 to 20 carbon atoms (such as formic acid, acetic acid, propionic acid, and malic acid) or a sulfamic acid and a neutralization agent. Examples of the neutralization agent include the aforementioned ones for compounds containing an anionic group and active hydrogen.

Examples of the inorganic salts include alkali metal salts, alkaline earth metal salts, magnesium salts, and ammonium salts.

Examples of the alkali metal salts include alkali metal carbonates (such as sodium carbonate, sodium hydrogen carbonate, potassium carbonate, potassium hydrogen carbonate, and lithium carbonate), alkali metal sulfates (sodium sulfate and potassium sulfate), alkali metal nitrates (sodium nitrate and potassium nitrate), alkali metal phosphates (sodium phosphate, sodium hydrogen phosphate, and potassium phosphate), alkali metal sulfites (sodium sulfite, sodium hydrogen sulfite, and potassium sodium), and alkali metal halides (chlorides, bromides, iodides, or fluorides) (such as sodium chloride, potassium chloride, sodium bromide, potassium iodide, and potassium fluoride).

Examples of the alkaline earth metal salts include alkaline earth metal carbonates (such as calcium carbonate), alkaline earth metal sulfates (such as calcium sulfate), alkaline earth metal nitrates (such as calcium nitrate), alkaline earth metal phosphates (such as calcium hydrogen phosphate), alkaline earth metal sulfites (such as calcium sulfite), and alkaline earth metal halides (chlorides, bromides, iodides, or fluorides) (such as calcium chloride, calcium bromide, calcium iodide, and calcium fluoride).

Examples of the magnesium salts include magnesium carbonate, magnesium sulfate, magnesium nitrate, magnesium hydrogen phosphate, magnesium sulfite, magnesium chloride, magnesium bromide, magnesium iodide, and magnesium fluoride. Examples of the ammonium salts include halogenated ammonium (such as chloride ammonium and ammonium bromide).

Of these, from the viewpoint of thermosensitive coagulability performance, preferable thermosensitive coagulation agents include organic acids and inorganic salts, and more preferable thermosensitive coagulation agents include alkaline earth metal salts and magnesium salts.

When the polyurethane resin is one derived from a compound containing a hydrophilic group and active hydrogen, the combined use of a surface active agent is preferable from the viewpoint of thermosensitive coagulability, and if one is to be used in combination, it is preferable to adopt a nonionic surface active agent, and among other nonionic surface active agents, it is more preferable to use a nonionic surface active agent having a clouding point of 40° C. to 180° C.

For the polyurethane resin composition in the form of polyurethane resin particles dispersed in an aqueous medium, the thermosensitive coagulation temperature is preferably 40° C. to 90° C., more preferably 50° C. to 80° C., from the viewpoint of storage stability and the texture of processed fiber products. The thermosensitive coagulation temperature of a polyurethane resin composition can be determined by heating a test piece and reading the temperature at which it coagulates and no longer flows.

Preferably, polyurethane resin is added first, and the resulting polyurethane impregnated sheet like article is divided into halves or a few parts in the sheet thickness direction, which ensures a high production efficiency.

Prior to the surface fiber raising step described later, a lubricant such as silicone emulsion may be added to the polyurethane impregnated sheet like article. Furthermore, the addition of an antistatic agent prior to the surface fiber raising step is preferred for making it less likely that ground powder generated from the sheet like article by grinding will deposit on the sandpaper.

A surface fiber raising step may be performed to raise fibers on the surface of the sheet like article. The surface fiber raising treatment can be performed by grinding with sandpaper, roll sander, or the like.

The thickness of the sheet like article is preferably about 0.1 to 5.0 mm because if the thickness is too small, physical characteristics such as tensile strength and tear strength of the sheet like article will deteriorate whereas if the thickness is too large, the texture of the sheet like article will become stiff.

The sheet like article can be dyed. A preferable dyeing method is the use of a jet dyeing machine which has a kneading effect to soften the sheet like article while dyeing the sheet like article. If the dyeing temperature is excessively high, the polyurethane sometimes degrades, whereas if the temperature is excessively low, the dye will not adhere to the fiber sufficiently and, accordingly, it is appropriate to set the dyeing temperature depending on the kind of the fiber. Generally, the dyeing temperature is preferably 80° C. or more and 150° C. or less, more preferably 110° C. or more and 130° C. or less.

The dye to be used may be selected to suit the fiber that constitutes the fibrous base material, and if it is a polyester based fiber, for example, a dispersed dye can be employed, whereas if it is a polyamide based fiber, an acidic dye or a metal-containing dye can be used. Moreover, combinations of such dyes can also be employed. When the dyeing is carried out with a dispersed dye, reduction cleaning may be performed after the dyeing.

Preferably, a dyeing assistant may be used in the dyeing step. The use of a dyeing assistant can serve to improve the dyeing uniformity and reproducibility. Furthermore, finishing with a softening agent (such as silicone), an antistatic agent, a water repellent, a flame retardant, a light resistance agent, an antimicrobial agent or the like may be performed simultaneously with dyeing in the same bath or after the dyeing step.

The sheet like article can be suitably used mainly as artificial leather components of, for example, the following: furniture, chairs and wall materials; interior materials with highly graceful external appearance for surface decoration of seats, ceilings, interiors of vehicles including motor vehicles, trains, and aircraft; shirts, jackets, and uppers, trims of casual shoes, sports shoes, men's shoes, women's shoes; bags, belts, wallets, and clothing materials used as parts thereof; and industrial use materials such as wiping clothes, grinding clothes, and CD curtains.

EXAMPLES

Hereinafter, the sheet like article and the method of production thereof are described in more detail with reference to Examples, although this disclosure is not limited only to these Examples.

Evaluation Methods (1) Texture of Sheet Like Article:

A. Compressibility

As an indicator of the flexibility of a sheet like article, compressibility was measured as follows according to the method described in JIS L 1096-8.20 (2010): A stack of three 3 cm×3 cm test pieces was left to stand for 1 minute under a reference pressure of 50 gf/cm$^2$, subjected to thickness measurement (T0 mm), then left to stand again for another 1 minute under a pressure of 300 gf/cm$^2$, and subjected to thickness measurement (T1 mm). From the thickness measurements taken according to the method mentioned above, the compressibility (Cr %) was calculated by the following equation:

$$Cr=(T0-T1)/T0 \times 100$$

B. Compression Modulus

As an indicator of the crease recoverability of a sheet like article, compressibility was measured as follows according to the method described in JIS L 1096-8.20 (2010): A stack of three 3 cm×3 cm test pieces was left to stand for 1 minute under a reference pressure of 50 gf/cm², subjected to thickness measurement (T0 mm), then left to stand again for another 1 minute under a pressure of 300 gf/cm², and subjected to thickness measurement (T1 mm). After removing the applied pressure, the test piece was left to stand for another 1 minute under the reference pressure and subjected to thickness measurement (T2 mm), and the compression modulus (Ce %) was calculated by the following equation from the thickness measurements taken according to the method mentioned above.

$$Ce=(T1-T2)/T1\times100$$

(2) Content of Urethane Group and Urea Group in Polyurethane Resin:

The content of the urethane group and urea group in a polyurethane resin is calculated by the following equation from the sum of the mass of the urethane group and that of the urea group in the polyurethane resin.

Content of urethane group and urea group (%)=[(total mass of urethane group (—NHCOO—) and/or urea group (—NHCONH—) and (—NHCON<))/mass of polyurethane resin]×100

The concentration of the urethane group and that of the urea group can also be determined by the following analysis method.

The concentration of the urethane group and that of the urea group in a polyurethane resin are calculated from the nitrogen atom content determined by nitrogen analyzer (ANTEK7000, manufactured by ANTEC. Co., Ltd.) and the ratio between the urethane group and urea group determined by 1H-NMR. 1H-NMR measurement is performed according to Structural Study of Polyurethane Resin by NMR, Journal of the Takeda Research Laboratories, 34(2), 224-323, 1975. Specifically, when an aliphatic substance is used for 1H-NMR, the mass ratio between the urea group and the urethane group is determined from the ratio between the integration of hydrogen attributed to the urea group near a chemical shift of 6 ppm and the integration of hydrogen attributed to the urethane group near a chemical shift of 7 ppm, and the concentration of the urethane group and that of the urea group are calculated from the above mass ratio and the aforementioned nitrogen atom content. When an aromatic isocyanate is used, the mass ratio between the urea group and the urethane group is determined from the ratio between the integration of hydrogen attributed to the urea group near a chemical shift of 8 ppm and the integration of hydrogen attributed to the urethane group near a chemical shift of 9 ppm, and the concentration of the urethane group and that of the urea group are calculated from the above mass ratio and the aforementioned nitrogen atom content.

If the relevant polyurethane resin has a crosslinked structure in its molecule and is low in solubility in solvents, the polyurethane resin may be hydrolyzed under basic conditions in sodium hydroxide, pyridine and the like, to allow the isocyanate component to be recovered as amine. Then, FTIR, NMR, GC-MS, and LC-MS analyses are carried out for each component to determine the contents of the urethane group and/or urea group.

(3) Polymeric Polyol in Polyurethane Resin:

The polyurethane resin was dissolved in a DMF solution, and NMR, IR, GC-MS, LC-MS, and SEC analyses were performed to determine the type of the polymeric polyol (polycarbonate polyol, polyester polyol, polyether polyol) and calculate the mass ratio of the relevant polyol. When the polyurethane resin was not easily dissolved in DMF, it was hydrolyzed under basic conditions in sodium hydroxide, pyridine or the like, for decomposition into components to allow their analysis to be implemented.

(4) Viscoelasticity Characteristics of Polyurethane Resin Film:

The storage elastic modulus E' and tan δ were determined for a film of polyurethane resin with a film thickness of 200 μm using a storage elastic modulus measuring apparatus (Rheogel E4000, manufactured by UBM) at a frequency of 11 Hz.

(5) Durability (Hydrolysis Resistance)

The resulting sheet like article was subjected to forced hydrolysis treatment by leaving it to stand for 5 weeks in an atmosphere at a temperature of 70° C. and a relative humidity of 95% in a constant temperature and humidity tank manufactured by Tabai Espec Corp. The treated test piece was subjected to abrasion evaluation using a Model 406 Martindale abrasion testing machine (manufactured by James H. Heal & Co.) as specified in JIS L1096 (2005). Using Abrasive Cloth SM25 reference friction cloth provided by the manufacturer, the test piece was subjected to 10,000 cycles of abrasion under a load equivalent to 12 kPa and its appearance was observed and evaluated visually. Evaluation was performed based on Pilling Evaluation Reference Photograph 2 specified in JIS L 1076 (2005). A test piece of grade 4 or higher was ranked as good.

(6) Durability (Light Resistance)

The resulting sheet like article was subjected to forced degradation treatment by exposing it for 144 hours to light with a wavelength of 300 to 400 nm at an irradiance of 150 W/m² using a xenon weather meter manufactured by Suga Test Instruments Co., Ltd. according to JIS L0843 B-6 (2005), and subsequently, abrasion evaluation was performed using a Martindale abrasion testing machine (Model 406, manufactured by James H. Heal & Co.). Using Abrasive Cloth SM25 reference friction cloth provided by the manufacturer, the test piece was subjected to 10,000 cycles of abrasion under a load equivalent to 12 kPa and its appearance was observed and evaluated visually. Evaluation was performed based on Pilling Evaluation Reference Photograph 2 specified in JIS L 1076 (2005). A test piece of grade 4 or higher was ranked as good.

(7) External Appearance Quality of Sheet Like Article

The external appearance quality of a sheet like article was rated on a five grade scale in visual inspection and sensory evaluation by a total of 20 raters made up of 10 males and 10 females who were healthy adults. The rating given by the greatest number of raters was adopted to represent the external appearance quality. For the external appearance quality, test pieces rated as grade 4 or higher were ranked as good.

Grade 5: Uniformly raised surface fibers were seen and the dispersed state of fiber was good, resulting in a good external appearance.

Grade 4: This grade is between grade 5 and grade 3.

Grade 3: The dispersed state of fiber is partially not very good, but raised surface fibers were found, resulting in a fairly good external appearance.

Grade 2: This grade is between grade 3 and grade 1.

Grade 1: The dispersed state of fiber is very poor as a whole, and the external appearance is at rejectable level.

Preparation Method for Water Dispersed Type Polyurethane Resin Composition

Production Example 1 (Preparation of Polyester Polyol Having a Carbonate Group and an Oxycarbonyl Group as Ester Groups (a))

In a reaction container equipped with a stirrer and heater, 500 parts by mass of a polycarbonate diol with a Mn of 2,000 (ETERNACOLL UH-200, manufactured by Ube Industries, Ltd.), 500 parts by mass of a polycaprolactone diol with a Mn of 2,000 (PLACCEL 220, manufactured by Daicel Chemical Industries, Ltd.), and 0.1 part by mass of dibutyltin oxide acting as catalyst were fed, heated in a nitrogen atmosphere at a temperature of 220° C., and subjected to ester interchange reaction for 10 hours to provide a polyester polyol having a carbonate group and an oxycarbonyl group as ester groups (a) with a Mn of 2,000.

Production Example 2 (Preparation of Polyester Polyol Having a Carbonate Group and an Oxycarbonyl Group as Ester Groups (b))

Except for feeding 600 parts by mass of a polycarbonate diol with a Mn of 2,000 (ETERNACOLL UH-200, manufactured by Ube Industries, Ltd.) and 400 parts by mass of a polycaprolactone diol with a Mn of 2,000 (PLACCEL 220, manufactured by Daicel Chemical Industries, Ltd.), the same procedure as in Production example 1 was carried out to produce a polyester polyol having a carbonate group and an oxycarbonyl group as ester groups (b).

Production Example 3 (Preparation of Polyester Polyol Having a Carbonate Group and an Oxycarbonyl Group as Ester Groups (c))

Except for feeding 400 parts by mass of a polycarbonate diol with a Mn of 2,000 (ETERNACOLL UH-200, manufactured by Ube Industries, Ltd.) and 600 parts by mass of a polycaprolactone diol with a Mn of 2,000 (PLACCEL 220, manufactured by Daicel Chemical Industries, Ltd.), the same procedure as in Production example 1 was carried out to produce a polyester polyol having a carbonate group and an oxycarbonyl group as ester groups (c).

Production Example 4 (Preparation of Polyester Polyol Having a Carbonate Group and an Oxycarbonyl Group as Ester Groups (d))

Except for using a polycarbonate diol with a Mn of 2,000 (DURANOL T5652, manufactured by Asahi Kasei Chemicals Corporation) instead of a polycarbonate diol with a Mn of 2,000 (ETERNACOLL UH-200, manufactured by Ube Industries, Ltd.), the same procedure as in Production example 1 was carried out to produce a polyester polyol having a carbonate group and an oxycarbonyl group as ester groups (d).

Preparation of Aqueous Dispersion of Polyurethane Resin Composition A

First, 219 parts by mass of the polyester polyol (a) obtained in Production example 1, 73 parts by mass of a polycarbonate diol with a Mn of 2,000 (DURANOL T5652, manufactured by Asahi Kasei Chemicals Corporation), 3.1 parts by mass of ethylene glycol, 7.6 parts by mass of 2,2-dimethylol propionic acid, 95 parts by mass of 4,4'-MDI, and 214 parts by mass of methyl ethyl ketone were fed in a simple compression reaction apparatus equipped with a stirrer and a heater. Then, the mixture was heated in a dry nitrogen atmosphere at a temperature of 65° C. and subjected to a urethanation reaction for 10 hours to produce a urethane prepolymer having an isocyanate group.

After cooling the reaction solution to a temperature of 30° C., 3.3 parts by mass of a hindered phenol based antioxidant (IRGANOX 1010, manufactured by BASF), 3.3 parts by mass of a benzotriazole based ultraviolet absorber (TINUVIN 571, manufactured by BASF), 6.6 parts by mass of a hindered amine based photostabilizer (TINUVIN 144, manufactured by BASF), 5.7 parts by mass of triethyl amine, and 272 parts by mass of methyl ethyl ketone were added and mixed, followed by further adding an aqueous solution of 40 parts by mass of an EO 25 mole adduct of styrenated (5 moles) cumyl phenol dissolved in 160 parts by mass of water, emulsifying the mixture in a rotator-stator type mechanical emulsifying apparatus, further adding 358 parts by mass of water, and mixing it in a rotator-stator type mechanical emulsifying apparatus to provide an aqueous dispersion.

While stirring the resulting aqueous dispersion, a solution of 4.7 parts by mass of 4,4'-diphenyl methane diamine dissolved in a mixed solution of 63 parts by mass of water and 32 parts by mass of acetone was added and stirred for 5 hours at a temperature of 50° C. to carry out a chain extension reaction. Subsequently, methyl ethyl ketone and acetone were evaporated under reduced pressure at a temperature of 70° C. to provide an aqueous dispersion of polyurethane resin composition A.

Preparation of Aqueous Dispersion of Polyurethane Resin Composition B

First, 329 parts by mass of the polyester polyol (b) obtained in Production example 2, 1.0 part by mass of ethylene glycol, 7.9 parts by mass of 2,2-dimethylol butanoic acid, 91 parts by mass of 4,4'-MDI, and 286 parts by mass of methyl ethyl ketone were fed in a simple compression reaction apparatus equipped with a stirrer and a heater. Then, the mixture was heated in a dry nitrogen atmosphere at a temperature of 65° C. and subjected to a urethanation reaction for 10 hours to produce a urethane prepolymer having an isocyanate group.

After cooling the reaction solution to a temperature of 30° C., 0.9 parts by mass of a hindered phenol based antioxidant (IRGANOX 1010, manufactured by BASF), 1.4 parts by mass of a benzotriazole based ultraviolet absorber (TINUVIN 571, manufactured by BASF), 1.8 parts by mass of a hindered amine based photostabilizer (TINUVIN 144, manufactured by BASF), 143 parts by mass of methyl ethyl ketone, and 5.4 parts by mass of triethyl amine were added and mixed, and then, while stirring, an aqueous solution of 51 parts by mass of an EO 25 mole adduct of styrenated (5 moles) cumyl phenol dissolved in 206 parts by mass of water was added over 5 minutes, and achieved emulsification by adding 304 parts by mass of water over 5 minutes to provide an aqueous dispersion. Stirring was continued for 5 hours at a temperature of 50° C. to carry out a chain extension reaction. Subsequently, methyl ethyl ketone was evaporated under reduced pressure at a temperature of 70° C. to provide an aqueous dispersion of polyurethane resin composition B.

Preparation of Aqueous Dispersion of Polyurethane Resin Composition C

First, 266 parts by mass of the polyester polyol (c) obtained in Production example 3, 2.5 parts by mass of 1,4-butanediol, 8.8 parts by mass of 2,2-dimethylol butanoic acid, 55 parts by mass of HDI, and 222 parts by mass of acetone were fed in a simple compression reaction apparatus equipped with a stirrer and a heater. Then, the mixture was heated in a dry nitrogen atmosphere at a temperature of 75° C. and subjected to a urethanation reaction for 10 hours to produce a urethane prepolymer having an isocyanate group.

After cooling the reaction solution to a temperature of 40° C., 3.3 parts by mass of a hindered phenol based antioxidant (IRGANOX 1010, manufactured by BASF), 3.3 parts by mass of a benzotriazole based ultraviolet absorber (TINUVIN 571, manufactured by BASF), 6.6 parts by mass of a hindered amine based photostabilizer (TINUVIN 144, manufactured by BASF), 278 parts by mass of acetone, 6.9 parts by mass of an E014 mole adduct of an hexadecyl alcohol, and 3.9 parts by mass of triethyl amine were added and mixed, followed by further adding 550 parts by mass of water and emulsifying it in a rotator-stator type mechanical emulsifying apparatus to provide an aqueous dispersion.

While stirring the resulting aqueous dispersion, an aqueous solution of 2.8 parts by mass of ethylene diamine dissolved in 98 parts by mass of water was added and stirred for 5 hours at a temperature of 50° C. to carry out a chain extension reaction. Subsequently, acetone was evaporated under reduced pressure at a temperature of 65° C. and 19 parts by mass of a carbodiimide based crosslinking agent (CARBODILITE E-04, manufactured by Nisshinbo Industries, Inc.) was added, followed by mixing to provide an aqueous dispersion of polyurethane resin composition C.

Preparation of Aqueous Dispersion of Polyurethane Resin Composition D

First, 276 parts by mass of the polyester polyol (d) obtained in Production example 4, 6.4 parts by mass of 2,2-dimethylol propionic acid, 50 parts by mass of a mixture of 2,4-tolylene diisocyanate and 2,6-tolylene diisocyanate (Coronate T-80, manufactured by Nippon Polyurethane Industry Co., Ltd.), and 222 parts by mass of methyl ethyl ketone were fed in a simple compression reaction apparatus equipped with a stirrer and a heater. Then, the mixture was heated in a dry nitrogen atmosphere at a temperature of 65° C. and subjected to a urethanation reaction for 10 hours to produce a urethane prepolymer having an isocyanate group.

After cooling the reaction solution to a temperature of 30° C., 3.3 parts by mass of a hindered phenol based antioxidant (IRGANOX 1010, manufactured by BASF), 3.3 parts by mass of a benzotriazole based ultraviolet absorber (TINUVIN 571, manufactured by BASF), 6.6 parts by mass of a hindered amine based photostabilizer (TINUVIN 144, manufactured by BASF), 111 parts by mass of methyl ethyl ketone, and 8.3 parts by mass of triethyl amine were added and mixed, and then, while stirring, an aqueous solution of 27 parts by mass of an EO 25 mole adduct of styrenated (5 moles) cumyl phenol dissolved in 108 parts by mass of water was added over 5 minutes, and achieved emulsification by adding 400 parts by mass of water over 5 minutes to provide an aqueous dispersion.

Subsequently, after stirring for 5 hours at a temperature of 50° C. to carry out a chain extension reaction, methyl ethyl ketone was evaporated under reduced pressure at a temperature of 70° C. and 5.0 parts by mass of a carbodiimide based crosslinking agent (CARBODILITE E-04, manufactured by Nisshinbo Industries, Inc.) was added, followed by mixing to provide an aqueous dispersion of polyurethane resin composition D.

Preparation of Aqueous Dispersion of Polyurethane Resin Composition E

First, 290 parts by mass of the polyester polyol (a) obtained in Production example 1, 1.4 part by mass of ethylene glycol, 11.4 parts by mass of 2,2-dimethylol propionic acid, 95 parts by mass of 4,4'-MDI, and 170 parts by mass of methyl ethyl ketone were fed in a simple compression reaction apparatus equipped with a stirrer and a heater. Then, the mixture was heated in a dry nitrogen atmosphere at a temperature of 65° C. and subjected to a urethanation reaction for 10 hours to produce a urethane prepolymer having an isocyanate group.

After cooling the reaction solution to a temperature of 30° C., 3.3 parts by mass of a hindered phenol based antioxidant (IRGANOX 1010, manufactured by BASF), 3.3 parts by mass of a benzotriazole based ultraviolet absorber (TINUVIN 571, manufactured by BASF), 6.6 parts by mass of a hindered amine based photostabilizer (TINUVIN 144, manufactured by BASF), 430 parts by mass of methyl ethyl ketone, and 5.8 parts by mass of triethyl amine were added and mixed, and then, while stirring, a solution of 20 parts by mass of an EO 25 mole adduct of styrenated (5 moles) cumyl phenol and 4.8 parts by mass of 4,4'-diphenyl methane diamine dissolved in a mixed solvent of 180 parts by mass of water and 18 parts by mass of methyl ethyl ketone was added over 5 minutes, and achieved emulsification by adding 250 parts by mass of water over 5 minutes to provide an aqueous dispersion. Subsequently, a chain extension reaction was carried out by stirring for 5 hours at a temperature of 50° C. and methyl ethyl ketone was evaporated under reduced pressure at a temperature of 70° C. to provide an aqueous dispersion of polyurethane resin composition E.

Preparation of Aqueous Dispersion of Polyurethane Resin Composition F

First, 301 parts by mass of a polycarbonate diol with a Mn of 2,000 having only a carbonate group as ester group (DURANOL T6002, manufactured by Asahi Kasei Chemicals Corporation), 3.3 parts by mass of ethylene glycol, 7.6 parts by mass of 2,2-dimethylol propionic acid, and 86 parts by mass of IPDI were fed to a reaction container equipped with a stirrer and a heater, followed by adding 214 parts by mass of acetone. Then, the mixture was heated in a dry nitrogen atmosphere at a temperature of 90° C. and subjected to a urethanation reaction for 15 hours to produce a urethane prepolymer having an isocyanate group.

After cooling the reaction solution to a temperature of 40° C., 3.3 parts by mass of a hindered phenol based antioxidant (IRGANOX 1010, manufactured by BASF), 3.3 parts by mass of a benzotriazole based ultraviolet absorber (TINUVIN 571, manufactured by BASF), 6.6 parts by mass of a hindered amine based photostabilizer (TINUVIN 144, manufactured by BASF), 4.0 parts by mass of an E014 mole adduct of an hexadecyl alcohol, and 5.7 parts by mass of triethyl amine were added and mixed, followed by further adding 550 parts by mass of water and emulsifying it in a rotator-stator type mechanical emulsifying apparatus to provide an aqueous dispersion. While stirring the resulting aqueous dispersion, an aqueous solution of 1.5 parts by mass of ethylene diamine dissolved in 45 parts by mass of water was added and stirred for 5 hours at a temperature of 50° C. to carry out a chain extension reaction. Subsequently, acetone was evaporated under reduced pressure at a temperature of 65° C. to provide an aqueous dispersion of polyurethane resin composition F.

Preparation of Aqueous Dispersion of Polyurethane Resin Composition G

Except for replacing the polycarbonate diol (DURANOL T6002, manufactured by Asahi Kasei Chemicals Corporation) with a polyester polyol with a Mn of 2,000 having only an oxycarbonyl group as ester group (Sanester 24620, manufactured by Sanyo Chemical Industries Ltd.), the same procedure as in Comparative example 1 was carried out to produce an aqueous dispersion of polyurethane resin composition G.

Preparation of Aqueous Dispersion of Polyurethane Resin Composition H

Except for replacing the polycarbonate diol (DURANOL T6002, manufactured by Asahi Kasei Chemicals Corporation) with a polytetramethylene glycol with a Mn of 2,000 (PTMG2000, manufactured by Mitsubishi Chemical Corporation), the same procedure as in Comparative example 1 was carried out to produce an aqueous dispersion of polyurethane resin composition H.

Preparation of Aqueous Dispersion of Polyurethane Resin Composition I

First, 251 parts by mass of the polyester polyol (a) obtained in Production example 1, 12 parts by mass of 1,4-butanediol, 13 parts by mass of 2,2-dimethylol butanoic acid, 122 parts by mass of IPDI, and 170 parts by mass of acetone were fed in a simple compression reaction apparatus equipped with a stirrer and a heater. Then, the mixture was heated in a dry nitrogen atmosphere at a temperature of 90° C. and subjected to a urethanation reaction for 15 hours to produce a urethane prepolymer having an isocyanate group.

After cooling the reaction solution to a temperature of 40° C., 3.3 parts by mass of a hindered phenol based antioxidant (IRGANOX 1010, manufactured by BASF), 3.3 parts by mass of a benzotriazole based ultraviolet absorber (TINUVIN 571, manufactured by BASF), 6.6 parts by mass of a hindered amine based photostabilizer (TINUVIN 144, manufactured by BASF), 227 parts by mass of acetone, and 5.8 parts by mass of triethyl amine were added and mixed, and then while stirring, an aqueous solution of 4.0 parts by mass of a EO 14 mole adduct of hexadecyl alcohol dissolved in 306 parts by mass of water was added over 60 minutes, followed by emulsification to provide an aqueous dispersion. Subsequently, an aqueous solution of 4.3 parts by mass of ethylene diamine dissolved in 120 parts by mass of water was added and a chain extension reaction was carried out by stirring for 5 hours at a temperature of 50° C., followed by evaporating acetone under reduced pressure at a temperature of 65° C. to provide an aqueous dispersion of polyurethane resin composition I.

Preparation of Aqueous Dispersion of Polyurethane Resin Composition J

First, 334 parts by mass of the polyester polyol (a) obtained in Production example 1, 4.3 parts by mass of 2,2-dimethylol propionic acid, 59 parts by mass of IPDI, and 170 parts by mass of acetone were fed in a simple compression reaction apparatus equipped with a stirrer and a heater. Then, the mixture was heated in a dry nitrogen atmosphere at a temperature of 90° C. and subjected to a urethanation reaction for 15 hours to produce a urethane prepolymer having an isocyanate group.

After cooling the reaction solution to a temperature of 40° C., 3.3 parts by mass of a hindered phenol based antioxidant (IRGANOX 1010, manufactured by BASF), 3.3 parts by mass of a benzotriazole based ultraviolet absorber (TINUVIN 571, manufactured by BASF), 6.6 parts by mass of a hindered amine based photostabilizer (TINUVIN 144, manufactured by BASF), 426 parts by mass of acetone, and 3.2 parts by mass of triethyl amine were added and mixed, and then while stirring, an aqueous solution of 40 parts by mass of a EO 14 mole adduct of hexadecyl alcohol dissolved in 426 parts by mass of water was added over 120 minutes, followed by emulsification to provide an aqueous dispersion. Subsequently, a chain extension reaction was carried out by stirring for 5 hours at a temperature of 50° C. and acetone was evaporated under reduced pressure at a temperature of 65° C. to provide an aqueous dispersion of polyurethane resin composition J.

Preparation of Aqueous Dispersion of Polyurethane Resin Composition K

First, 290 parts of the polyester polyol (e) obtained in Production example 1, 100 parts of a polycarbonate diol with a Mn of 2,000 (KURARAY POLYOL C-3090, manufactured by Kuraray Co., Ltd.), 0.3 part of ethylene glycol, 5.9 parts of 2,2-dimethylol propionic acid, 72 parts of 4,4'-MDI, and 214 parts of methyl ethyl ketone were fed in a simple compression reaction apparatus equipped with a stirrer and a heater. Then, the mixture was heated in a dry nitrogen atmosphere at 65° C. and subjected to a urethanation reaction for 10 hours to produce a urethane prepolymer having an isocyanate group. After cooling the reaction solution to 30° C., 3.3 parts of a hindered phenol based antioxidant (IRGANOX 1010, manufactured by BASF), 3.3 parts of a benzotriazole based ultraviolet absorber (TINUVIN 571, manufactured by BASF), 6.0 parts a hindered amine based photostabilizer (TINUVIN 144, manufactured by BASF), 4.5 parts of triethyl amine, and 272 parts of methyl ethyl ketone were added and mixed, followed by further adding an aqueous solution of 40 parts of an EO 25 mole adduct of styrenated (5 moles) cumyl phenol dissolved in 160 parts of water, emulsifying the mixture in a rotator-stator type mechanical emulsifying apparatus, further adding 358 parts of water, and mixing it in a rotator-stator type mechanical emulsifying apparatus to provide an aqueous dispersion. While stirring the resulting aqueous dispersion, a solution of 5.2 parts of 4,4'-diphenyl methane diamine dissolved in a mixed solution of 63 parts of water and 32 parts of acetone was added and stirred for 5 hours at a temperature of 50° C. to carry out a chain extension reaction. Subsequently, methyl ethyl ketone and acetone were evaporated under reduced pressure at a temperature of 70° C. to provide an aqueous dispersion of polyurethane resin composition K.

Preparation of Aqueous Dispersion of Polyurethane Resin Composition L

First, 240 parts by mass of the polyester polyol (a) obtained in Production example 1, 2 parts of 1,4-butanediol, 13 parts of 2,2-dimethylol butanoic acid, 85 parts of IPDI, and 170 parts of acetone were fed in a simple compression reaction apparatus equipped with a stirrer and a heater. Then, the mixture was heated in a dry nitrogen atmosphere at 90° C. and subjected to a urethanation reaction for 15 hours to produce a urethane prepolymer having an isocyanate group. After cooling the reaction solution to 40° C., 3.3 parts of a hindered phenol based antioxidant (IRGANOX 1010, manufactured by BASF), 3.3 parts of a benzotriazole based ultraviolet absorber (TINUVIN 571, manufactured by BASF), 6.0 parts of a hindered amine based photostabilizer (TINUVIN 144, manufactured by BASF), and 5.8 parts of triethyl amine were added and mixed, and then while stirring, an aqueous solution of 4.0 parts of a EO 14 mole adduct of hexadecyl alcohol dissolved in 200 parts of water was added over 60 minutes, followed by emulsification to provide an aqueous dispersion. Subsequently, an aqueous solution of 4.3 parts of ethylene diamine dissolved in 226 parts of water was added and a chain extension reaction was carried out by stirring for 5 hours at a temperature of 50° C., followed by evaporating acetone under reduced pressure at a temperature of 65° C. to provide an aqueous dispersion of polyurethane resin composition L.

The compositions and properties of polyurethane liquids A to J prepared as described above are collectively shown in Tables 1 and 2 given below.

TABLE 1

| Aqueous dispersion of polyurethane resin | | A | B | C | D | E |
|---|---|---|---|---|---|---|
| polyurethane resin | ratio by number between oxycarbonyl group and carbonate group in polyester polyol | 56:44 | 46:54 | 64:35 | 60:40 | 56:44 |
| | content of urethane group (mass %) | 7.5 | 6.5 | 7.8 | 6.6 | 7.5 |
| | content of urea group (mass %) | 2.1 | 1.7 | 2.7 | 1.7 | 2.1 |
| | Sum of content of urethane group and content of urea group (mass %) | 9.6 | 8.2 | 10.5 | 8.3 | 9.6 |
| Characteristics of dried film of aqueous dispersion of polyurethane resin | temperature of softening point (° C.) | 230 | 210 | 220 | 210 | 230 |
| | E' (MPa at 20° C.) | 23.5 | 10.1 | 36.7 | 9.5 | 14.7 |
| | tan δ (at 20° C.) | 0.18 | 0.16 | 0.15 | 0.19 | 0.14 |

TABLE 2

| Aqueous dispersion of polyurethane resin | | F | G | H | I | J | K | L |
|---|---|---|---|---|---|---|---|---|
| Polyurethane resin | ratio by number between oxycarbonyl group and carbonate group in polyester polyol | — | — | — | 56:44 | 56:44 | 56:44 | 56:44 |
| | content of urethane group (mass %) | 7.7 | 7.7 | 7.7 | 10.2 | 5.9 | 5.7 | 8.3 |
| | content of urea group (mass %) | 2.2 | 2.2 | 2.2 | 4.0 | 1.0 | 1.6 | 3.3 |
| | sum of content of urethane group and content of urea group (mass %) | 9.9 | 9.9 | 9.9 | 14.2 | 6.9 | 7.3 | 11.6 |
| Characteristics of dried film of aqueous dispersion of polyurethane resin | temperature of softening point (° C.) | 190 | 190 | 190 | 200 | 170 | 200 | 190 |
| | E' (MPa at 20° C.) | 76.3 | 35.1 | 26.6 | 85.8 | 3.0 | 6.2 | 35.2 |
| | tan δ (at 20° C.) | 0.37 | 0.26 | 0.19 | 0.41 | 0.32 | 0.15 | 0.36 |

Example 1

Polyethylene terephthalate copolymerized with 8 mol % sodium 5-sulfoisophthalate was used as sea component and polyethylene terephthalate was used as island component to produce a sea-island type composite fiber in which: the composition ratio was 20 mass % accounted for by the sea component vs. 80 mass % accounted for by the island component; the number of islands was 16 islands/filament; and the average filament diameter was 20 μm. The sea-island type composite fiber obtained was cut into pieces with a fiber length of 51 mm to provide staple. It was then passed through a card and a cross lapper to form a fiber web, which was then subjected to needle punching treatment to produce a nonwoven fabric. The nonwoven fabric obtained in this manner was shrunk by immersing it in hot water at a temperature of 97° C., and then dried at a temperature of 100° C. for 5 minutes to provide a nonwoven fabric for fibrous base material production.

Then, PVA with a saponification degree of 99% and a polymerization degree of 1400 (NM-14, manufactured by Nippon Synthetic Chemical Industry Co., Ltd.) was added to water at a temperature of 25° C., heated to a temperature of 90° C., and stirred for 2 hours while maintaining the temperature of 90° C. to adjust the solid content of the aqueous solution to 10 mass %, thereby providing an intended aqueous PVA solution. The above nonwoven fabric for fibrous base material production was impregnated with this aqueous PVA solution and dried by heating for 10 minutes at a temperature of 140° C. to provide a PVA-impregnated sheet in which the PVA added accounted for 30 mass % relative to the mass of the fiber in the nonwoven fabric for fibrous base material production.

Subsequently, the resulting PVA-impregnated sheet was impregnated with a liquid containing an aqueous dispersion of polyurethane resin composition A with a solid content adjusted to 20 mass % and magnesium sulfate added at a proportion of 1 part by mass relative to the polyurethane solid content, treated for 5 minutes in a moist heat atmosphere at a temperature of 97° C. and a humidity of 100%, and dried for 15 minutes in hot air at a temperature of 110° C. to provide a sheet containing polyurethane resin in which the mass of the polyurethane accounted for 35 mass % relative to the mass of the island component in the nonwoven fabric.

Subsequently, the sheet thus obtained was immersed in an aqueous sodium hydroxide solution with a concentration of 10 g/L heated at 95° C. and treated for 25 minutes to remove the sea component from the sea-island type composite fiber, thus providing a sea-free sheet. The average fiber diameter over the surface of the resulting sea-free sheet was 4.2 μm.

Then, the sea-free sheet was cut in half perpendicularly to the thickness direction using a cutting-in-half machine with an endless band knife, and the non-cut surface was polished with 120-mesh and 240-mesh sandpapers to raise surface fibers and dyed with a disperse dye using a circular dyeing machine, followed by reduction cleaning to provide a sheet like article with a unit weight of 276 g/m². The resulting sheet like article had a compressibility of 17.6%, a compression modulus of 67.6%, a good texture, good appearance quality, high light resistance, and high hydrolysis resistance.

Example 2

Except for impregnating the sheet base material with an aqueous dispersion of polyurethane resin composition B, the same procedure as in Example 1 was carried out to provide a sheet like article with a unit weight of 281 g/m². The resulting sheet like article had a compressibility of 17.5%, a compression modulus of 71.0%, a good texture, good appearance quality, high light resistance, and high hydrolysis resistance.

Example 3

Except for impregnating the sheet base material with an aqueous dispersion of polyurethane resin composition C, the same procedure as in Example 1 was carried out to provide a sheet like article with a unit weight of 277 g/m². The resulting sheet like article had a compressibility of 15.2%, a compression modulus of 72.9%, a good texture, good appearance quality, high light resistance, and high hydrolysis resistance.

Example 4

Except for impregnating the sheet base material with an aqueous dispersion of polyurethane resin composition D, the same procedure as in Example 1 was carried out to provide a sheet like article with a unit weight of 282 g/m². The resulting sheet like article had a compressibility of 15.8%, a compression modulus of 68.9%, a good texture, good appearance quality, high light resistance, and high hydrolysis resistance.

Example 5

Except for impregnating the sheet base material with an aqueous dispersion of polyurethane resin composition E, the same procedure as in Example 1 was carried out to provide a sheet like article with a unit weight of 285 g/m². The resulting sheet like article had a compressibility of 17.8%, a compression modulus of 72.1%, a good texture, good appearance quality, high light resistance, and high hydrolysis resistance.

Example 6

Polystyrene was used as sea component and polyethylene terephthalate was used as island component to provide a sea-island type composite fiber in which: the composition ratio was 20 mass % accounted for by the sea component vs. 80 mass % accounted for by the island component; the number of islands was 16 islands/filament; and the average fiber diameter was 20 µm. The resulting sea-island type composite fiber was cut into pieces with a fiber length of 51 mm to provide staple. It was then passed through a card and a cross lapper to form a fiber web and layers of the resulting web were subjected to needle punching treatment to provide a nonwoven fabric. The nonwoven fabric obtained in this manner was shrunk by immersing it in hot water at a temperature of 97° C., and then dried for 5 minutes at a temperature of 100° C.

Then, PVA with a saponification degree of 99% and a polymerization degree of 1400 (NM-14, manufactured by Nippon Synthetic Chemical Industry Co., Ltd.) was added to water at a temperature of 25° C., heated to a temperature of 90° C., and stirred for 2 hours while maintaining the temperature of 90° C. to adjust the solid content of the aqueous solution to 10 mass %, thereby providing an intended aqueous PVA solution. The above nonwoven fabric for fibrous base material production was impregnated with this aqueous PVA solution and dried by heating for 10 minutes at a temperature of 140° C. to provide a PVA-impregnated sheet in which the PVA added accounted for 30 mass % relative to the mass of the fiber in the nonwoven fabric for fibrous base material production.

Then, this PVA-impregnated sheet was immersed in trichloroethylene to dissolve and remove the sea component to provide a sea-free sheet of ultrafine fibers. The average fiber diameter over the surface of the resulting sea-free sheet was 4.2 µm.

Subsequently, the resulting sea-free sheet was impregnated with a liquid containing an aqueous dispersion of polyurethane resin composition A with a solid content adjusted to 20% and magnesium sulfate added at a proportion of 1 part by mass relative to the polyurethane solid content, treated for 5 minutes in a moist heat atmosphere at a temperature of 97° C. and a humidity of 100%, and dried for 15 minutes in hot air at a temperature of 110° C. to provide a sheet containing polyurethane resin in which the mass of the polyurethane accounted for 35 mass % relative to the mass of the island component in the nonwoven fabric.

Then, the resulting sheet was cut in half perpendicularly to the thickness direction using a cutting-in-half machine with an endless band knife, and the non-cut surface was polished with 120-mesh and 240-mesh sandpapers to raise surface fibers and dyed with a disperse dye using a circular dyeing machine, followed by reduction cleaning to provide an sheet like article with a unit weight of 292 g/m². The resulting sheet like article had a compressibility of 13.5%, a compression modulus of 75.4%, a good texture, good appearance quality, high light resistance, and high hydrolysis resistance.

Example 7

The same sea-island composite fiber as in Example 1 was passed through a card and a cross lapper to form a fiber web and layers of the resulting web were stacked, followed by sandwiching the stack of fiber web layers between two pieces of woven fabric with a weaving density of 96 ends and 76 picks per inch formed of 84-dtex, 72-filament twisted yarns used as both warp and weft and processing the stack by needle punching to provide a woven layer laminated nonwoven fabric.

The woven layer laminated nonwoven fabric obtained in this manner was shrunk by immersing it in hot water at a temperature of 97° C. and then dried for 5 minutes at a temperature of 100° C.

Subsequently, the sheet thus obtained was immersed in an aqueous sodium hydroxide solution with a concentration of 10 g/L heated at a temperature of 95° C. and treated for 10 minutes to remove the sea component from the sea-island type composite fiber, thereby providing a sea-free sheet. The average fiber diameter over the surface of the resulting sea-free sheet was 4.2 μm.

Subsequently, the resulting sea-free sheet was impregnated with a liquid containing an aqueous dispersion of polyurethane resin composition E with a solid content adjusted to 20%, sodium hydrogen carbonate (CELMIKE 266, manufactured by Sankyo Kasei Co., Ltd.) added at a proportion of 3 part by mass relative to the polyurethane resin solid content, and magnesium sulfate added at a proportion of 1 part by mass, treated for 5 minutes in a moist heat atmosphere at a temperature of 97° C. and a humidity of 100%, and dried for 15 minutes in hot air at a temperature of 110° C. to provide a sheet containing polyurethane resin in which the mass of the polyurethane accounted for 30 mass % relative to the mass of the fiber component (including the mass of the woven fabric) in the sea-free fabric.

Then, the sea-free sheet was cut in half perpendicularly to the thickness direction using a cutting-in-half machine with an endless band knife, and the non-cut surface was polished with 120-mesh and 240-mesh sandpapers to raise surface fibers and dyed with a disperse dye using a circular dyeing machine, followed by reduction cleaning to provide a sheet like article with a unit weight of 300 g/m$^2$. The resulting sheet like article had a compressibility of 14.2%, a compression modulus of 61.5%, a good texture, good appearance quality, high light resistance, and high hydrolysis resistance.

Example 8

A nonwoven fabric obtained in the same manner as in Example 1 was shrunk by immersing it in hot water at a temperature of 97° C., and then dried for 5 minutes at a temperature of 100° C. Subsequently, the resulting sea-free sheet was impregnated with a liquid containing an aqueous dispersion of polyurethane resin composition E with a solid content adjusted to 20%, sodium hydrogen carbonate (CELMIKE 266, manufactured by Sankyo Kasei Co., Ltd.) added at a proportion of 3 part by mass relative to the polyurethane resin solid content, and magnesium sulfate added at a proportion of 1 part by mass, treated for 5 minutes in a moist heat atmosphere at a temperature of 97° C. and a humidity of 100%, and dried for 15 minutes in hot air at a temperature of 110° C. to provide a sheet containing polyurethane resin in which the mass of the polyurethane resin accounted for 35 mass % relative to the mass of the island component in the sea-free fabric.

Subsequently, the sheet thus obtained was immersed in an aqueous sodium hydroxide solution with a concentration of 10 g/L heated at 95° C. and treated for 25 minutes to remove the sea component from the sea-island type composite fiber, thereby providing a sea-free sheet. The average fiber diameter over the surface of the resulting sea-free sheet was 4.2 μm.

Then, the resulting sea-free sheet was cut in half perpendicularly to the thickness direction using a cutting-in-half machine with an endless band knife, and the non-cut surface was polished with 120-mesh and 240-mesh sandpapers to raise surface fibers and dyed with a disperse dye using a circular dyeing machine, followed by reduction cleaning to provide an sheet like article with a unit weight of 282 g/m$^2$. The resulting sheet like article had a compressibility of 13.5%, a compression modulus of 59.4%, a good texture, good appearance quality, high light resistance, and high hydrolysis resistance.

Example 9

Except for impregnating the sheet base material with an aqueous dispersion of polyurethane resin composition K, the same procedure as in Example 1 was carried out to provide a sheet like article with a unit weight of 291 g/m$^2$. The resulting sheet like article had a compressibility of 13.2%, a compression modulus of 63.0%, a good texture, good appearance quality, high light resistance, and high hydrolysis resistance.

Example 10

Except for impregnating the sheet base material with an aqueous dispersion of polyurethane resin composition K, the same procedure as in Example 7 was carried out to provide a sheet like article with a unit weight of 292 g/m$^2$. The resulting sheet like article had a compressibility of 13.5%, a compression modulus of 58.2%, a good texture, good appearance quality, high light resistance, and high hydrolysis resistance.

Example 11

Except for impregnating the sheet base material with an aqueous dispersion of polyurethane resin composition K, the same procedure as in Example 8 was carried out to provide a sheet like article with a unit weight of 288 g/m$^2$. The resulting sheet like article had a compressibility of 13.3%, a compression modulus of 55.9%, a good texture, good appearance quality, high light resistance, and high hydrolysis resistance.

Comparative Example 1

Except for impregnating the sheet base material with an aqueous dispersion of polyurethane resin composition F, the same procedure as in Example 1 was carried out to provide a sheet like article with a unit weight of 290 g/m$^2$. The resulting sheet like article had a compressibility of 8.8%, a compression modulus of 86.0% and a somewhat stiff texture. Its appearance quality was poor in terms of fiber dispersibility. It was high in both light resistance and hydrolysis resistance.

Comparative Example 2

Except for impregnating the sheet base material with an aqueous dispersion of polyurethane resin composition G, the same procedure as in Example 1 was carried out to provide a sheet like article with a unit weight of 285 g/m$^2$. The resulting sheet like article had a compressibility of 18.3%, a compression modulus of 70.9%, a good texture, good appearance quality, and high light resistance, but it was low in hydrolysis resistance.

Comparative Example 3

Except for impregnating the sheet base material with an aqueous dispersion of polyurethane resin composition H, the same procedure as in Example 1 was carried out to provide a sheet like article with a unit weight of 288 g/m$^2$. The resulting sheet like article had a compressibility of 23.1%, a compression modulus of 56.1%, a poor texture suffering from insufficient resilience, low bending strength, and irrecoverable creases. It had good appearance quality and high hydrolysis resistance, but it was low in light resistance.

Comparative Example 4

Except for impregnating the sheet base material with an aqueous dispersion of polyurethane resin composition I, the same procedure as in Example 1 was carried out to provide a sheet like article with a unit weight of 295 g/m². The resulting sheet like article had a compressibility of 11.1%, a compression modulus of 49.0% and a somewhat stiff texture. Its appearance quality was poor in terms of fiber dispersibility. It was high in both light resistance and hydrolysis resistance.

Comparative Example 5

Except for impregnating the sheet base material with an aqueous dispersion of polyurethane resin composition J, the same procedure as in Example 1 was carried out to provide a sheet like article with a unit weight of 292 g/m². The resulting sheet like article had a compressibility of 32.1%, a compression modulus of 41.0%, a poor texture suffering from insufficient resilience, low bending strength, and irrecoverable creases. It was high in appearance quality, light resistance, and hydrolysis resistance.

Comparative Example 6

Except for impregnating the sheet base material with an aqueous dispersion of polyurethane resin composition L, the same procedure as in Example 1 was carried out to provide a sheet like article with a unit weight of 290 g/m². The resulting sheet like article had a compressibility of 11.0%, a compression modulus of 46.3% and a somewhat stiff texture. Its appearance quality was poor in terms of fiber dispersibility. It was high in both light resistance and hydrolysis resistance.

Results obtained in Examples 1 to 11 and results obtained in Comparative examples 1 to 6 are given in Tables 3 and 4, respectively. Sheet like articles having uniform, elegant surface quality, a flexible, highly crease recoverable texture, and high resistance to light and hydrolysis were obtained in the Examples, whereas the sheet like articles obtained in the Comparative examples failed to have both good quality and high durability.

TABLE 4

| No. | | Comparative examples | | | | | |
|---|---|---|---|---|---|---|---|
| | | 1 | 2 | 3 | 4 | 5 | 6 |
| Aqueous dispersion of polyurethane resin | | F | G | H | I | J | L |
| Artificial leather with a unit weight of | g/m² | 290 | 285 | 288 | 295 | 292 | 290 |
| Compressibility | % | 8.8 | 18.3 | 23.1 | 11.1 | 32.1 | 11.0 |
| Compression modulus | % | 86.0 | 70.9 | 56.1 | 49.0 | 41.0 | 46.3 |
| Light resistance | Grade | 4-5 | 4-5 | 2 | 4-5 | 4-5 | 4-5 |
| Hydrolysis resistance | Grade | 4-5 | 1-2 | 4-5 | 4-5 | 4 | 4-5 |
| Appearance quality | Grade | 2 | 4 | 5 | 3 | 4 | 3 |

The invention claimed is:

1. A sheet shaped article comprising a fibrous base material formed mainly of ultrafine fibers and impregnated with, as a binder, a polyurethane resin that meets requirements (I) and (II) below:
    (I) the polyurethane resin contains an oxycarbonyl group and a carbonate group as ester groups in an interior portion of a polymer chain forming the polyurethane resin, and
    (II) the polyurethane resin contains a urethane group and, optionally, a urea group with a total content of 7.0 to 11.0 mass %.

2. The sheet shaped article as set forth in claim 1, having a compressibility of 13% or more and 20% or less and a compression modulus of 55% or more and 75% or less.

3. The sheet shaped article as set forth in claim 1, wherein a ratio by number between the oxycarbonyl group and the carbonate group in the polymeric polyol present in the polyurethane resin is 5:95 to 95:5.

4. The sheet shaped article as set forth in claim 1, wherein 10 mass % to 100 mass % of the polymeric polyol molecules present in the polyurethane resin are accounted for by polyol molecules having an oxycarbonyl group and a carbonate group.

5. The sheet shaped article as set forth in claim 1, wherein the polyurethane resin has a hydrophilic group.

6. The sheet shaped article as set forth in claim 1, comprising a content of 1.0 to 4.0 mass % of the urea group, when present in the polyurethane resin.

7. The sheet shaped article as set forth in claim 1, wherein the organic polyisocyanate component of the polyurethane resin is at least one type of polyisocyanate selected from the

TABLE 3

| No. | | Examples | | | | | | | | | | |
|---|---|---|---|---|---|---|---|---|---|---|---|---|
| | | 1 | 2 | 3 | 4 | 5 | 6 | 7 | 8 | 9 | 10 | 11 |
| Aqueous dispersion of polyurethane resin | | A | B | C | D | E | E | E | E | K | K | K |
| Unit weight of artificial leather | g/m² | 276 | 281 | 277 | 282 | 285 | 292 | 300 | 282 | 291 | 292 | 288 |
| Compressibility | % | 17.6 | 17.5 | 15.2 | 15.8 | 17.8 | 13.5 | 14.2 | 13.5 | 13.2 | 13.5 | 13.3 |
| Compression modulus | % | 67.6 | 71.0 | 72.9 | 68.9 | 72.1 | 75.4 | 61.5 | 59.4 | 63.0 | 58.2 | 55.9 |
| Light resistance | grade | 4-5 | 4-5 | 4-5 | 4-5 | 4-5 | 4-5 | 4-5 | 4-5 | 4-5 | 4-5 | 4-5 |
| Hydrolysis resistance | grade | 4-5 | 4-5 | 4 | 4 | 4-5 | 4-5 | 4-5 | 4-5 | 4-5 | 4-5 | 4-5 |
| Appearance quality | grade | 5 | 5 | 5 | 5 | 5 | 5 | 5 | 5 | 5 | 5 | 5 | group consisting of an aromatic polyisocyanate containing 8 to 26 carbon atoms, an aliphatic polyisocyanate containing 4 to 22 carbon atoms, and an alicyclic polyisocyanate containing 8 to 18 carbon atoms.

8. The sheet shaped article as set forth in claim 1, wherein the organic polyisocyanate component of the polyurethane resin is an aromatic polyisocyanate.

9. The sheet shaped article as set forth in claim 1, wherein the polymeric polyol present in the polyurethane resin contains an amorphous polycarbonate polyol having a melting point of 20° C. or less.

10. The sheet shaped article as set forth in claim 1, wherein the polymeric polyol present in the polyurethane resin contains a polycarbonate polyol in the form of a copolymer of two or more types of polyhydric alcohol having different carbon backbones.

11. The sheet shaped article as set forth in claim 1, wherein the polyurethane resin has at least one reactive group selected from the group consisting of a carboxyl group, hydroxyl group, primary amino group, and secondary amino group and further contains a crosslinking agent that is at least one crosslinking agent selected from the group consisting of an isocyanate compound, block isocyanate compound, melamine compound, oxazoline compound, carbodiimide compound, aziridine compound, epoxy compound, and hydrazine compound and that is reactive to the reactive group contained in the polyurethane resin.

12. The sheet shaped article as set forth in claim 1, wherein the polyurethane resin is produced by coagulating an aqueous dispersion of polyurethane.

\* \* \* \* \*